United States Patent
Dallal et al.

(10) Patent No.: US 11,943,816 B2
(45) Date of Patent: Mar. 26, 2024

(54) RANDOM ACCESS PREAMBLE SPATIAL OVERLOADING

(71) Applicant: QUALCOMM Incorporated, San Diego, CA (US)

(72) Inventors: Yehonatan Dallal, Kfar Saba (IL); Ran Berliner, Kfar-Aviv (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 17/069,975

(22) Filed: Oct. 14, 2020

(65) Prior Publication Data

US 2022/0117002 A1 Apr. 14, 2022

(51) Int. Cl.
*H04W 74/08* (2009.01)
*H04W 56/00* (2009.01)

(52) U.S. Cl.
CPC ..... *H04W 74/0841* (2013.01); *H04W 56/001* (2013.01)

(58) Field of Classification Search
CPC . H04W 74/0841; H04W 76/10; H04W 74/00; H04W 74/02; H04W 74/004; H04W 74/008; H04W 74/08; H04W 74/0875; H04W 74/0833; H04W 74/04; H04W 74/0866; H04W 56/001; H04W 72/1263;
(Continued)

(56) References Cited

U.S. PATENT DOCUMENTS

| | | | |
|---|---|---|---|
| 2012/0002564 A1* | 1/2012 | Sexton | H03M 7/30 370/252 |
| 2013/0242730 A1* | 9/2013 | Pelletier | H04L 1/0046 370/230 |
| 2017/0048826 A1* | 2/2017 | Kishiyama | H04W 72/04 |

(Continued)

FOREIGN PATENT DOCUMENTS

| | | | | |
|---|---|---|---|---|
| WO | WO-2018058574 A1 * | 4/2018 | | H04B 7/02 |
| WO | WO-2021009821 A1 * | 1/2021 | | H04W 72/04 |

(Continued)

OTHER PUBLICATIONS

Non-Orthogonal Random Access (NORA) for 5G Networks, Liang (Year: 2017).*

(Continued)

*Primary Examiner* — Sudesh M Patidar
(74) *Attorney, Agent, or Firm* — Holland & Hart LLP

(57) ABSTRACT

Methods, systems, and devices for wireless communications are described. A user equipment (UE) may receive a configuration of random access resources from a base station. The configuration may indicate a quantity of a plurality of random access preambles, a quantity of a plurality of synchronization signal blocks (SSBs), and a quantity of random access preambles per SSB. The received configuration may indicate that each random access preamble of the plurality of random access preambles is available to the UE in the random access occasion for each SSB of a plurality of SSBs transmitted by the base station. The UE may select a random access preamble of the plurality of random access preambles based at least in part on the received configuration and transmit the selected random access preamble to the base station in the random access occasion.

28 Claims, 17 Drawing Sheets

(58) Field of Classification Search
CPC ......... H04W 72/1268; H04W 72/1273; H04W 72/048; H04W 72/04; H04W 72/1278
See application file for complete search history.

(56) References Cited

U.S. PATENT DOCUMENTS

| | | | |
|---|---|---|---|
| 2020/0100290 A1* | 3/2020 | Mundarath | H04W 16/28 |
| 2020/0229157 A1* | 7/2020 | Rastegardoost | H04L 5/0048 |
| 2020/0267770 A1 | 8/2020 | Islam et al. | |
| 2021/0051660 A1* | 2/2021 | Askar | H04B 7/0452 |
| 2021/0051672 A1* | 2/2021 | Rastegardoost | H04W 72/0493 |
| 2022/0104268 A1* | 3/2022 | Xiong | H04W 74/006 |
| 2022/0287058 A1* | 9/2022 | Bae | H04L 1/08 |

FOREIGN PATENT DOCUMENTS

| | | | |
|---|---|---|---|
| WO | WO-2021032024 A1 * | 2/2021 | ............ H04L 5/00 |
| WO | WO-2021088692 A1 * | 5/2021 | ............ H04W 74/08 |
| WO | WO-2021221381 A1 * | 11/2021 | ............ H04L 1/00 |
| WO | WO-2021256782 A1 * | 12/2021 | |
| WO | WO-2022057997 A1 * | 3/2022 | |

OTHER PUBLICATIONS

3GPP TS 38.331: "3rd Generation Partnership Project, Technical Specification Group Radio Access Network, NR, Radio Resource Control (RRC) Protocol Specification (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG2, No. V16.2.0, Oct. 7, 2020 (Oct. 7, 2020), pp. 1-921, XP051961610, Retrieved from the Internet: URL:ftp://ftp.3qpp.org/Specs/archive/38_series/38.331/38331-g20.zip 38331-g20.docx [retrieved on Oct. 7, 2020] p. 544-p. 548.

Ericsson: "Preamble Allocation When Several SSBs are Mapped to One RO", 3GPP TSG-RAN WG2 AH 1807, 3GPP Draft, Tdoc R2-1810078—Preamble Allocation When Several SSBS Are Mapped To One Ro, 3rd Generation Partnership Project (3GPP), Mobile Competence Centre, 650, Route Des Lucioles, F-06921 Sophia-Anti, vol. RAN WG2, No. Montreal, Canada, Jul. 2, 2018-Jul. 6, 2018, 4 Pages, Jul. 1, 2018 (Jul. 1, 2018), XP051467303, Retrieved from the Internet: URL: http://www.3gpp.org/ftp/Meetings%5F3GPP%5FSYNC/RAN2/Docs [retrieved on Jul. 1, 2018] Paragraph "2 Discussion".

International Search Report and Written Opinion—PCT/US2021/052685—ISA/EPO—dated Feb. 9, 2022.

LG Electronics Inc: "Discussion on Handling of TCI Update for BFR Over CBRA", 3GPP TSG-RAN WG2 Meeting #103bis, 3GPP Draft, R2-1815455 Discussion On Handling of TCI Update for BFR Over CBRA, 3rd Generation Partnership Project (3GPP), Mobile Competence Centre, 650, Route Des Lucioles, F-06921 Sophia-Antipolis, vol. RAN WG2, No. Chengdu, China, Oct. 8, 2018-Oct. 12, 2018, 3 Pages, Sep. 28, 2018 (Sep. 28, 2018), XP051524797, Retrieved from the Internet: URL: http://www.3gpp.org/ftp/tsg%5Fran/WG2%5FRL2/TSGR2%5F103bis/Docs/R2%2D1815455%2Ezip [retrieved on Sep. 28, 2018] Paragraph "2. Discussion".

* cited by examiner

RANDOM ACCESS PREAMBLE SPATIAL OVERLOADING

FIELD OF TECHNOLOGY

The following relates to wireless communications, including random access preamble spatial overloading.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support random access preamble spatial overloading. Generally, the described techniques provide for efficiently resolving random access preamble collisions by spatial beam resolution. For example, multiple user equipments (UEs) may transmit the same preamble to a base station in a random access channel (RACH) occasion, and the base station may identify the multiple UEs based on the spatial separation of the receive beams corresponding to the preambles.

For example, a UE may receive a configuration of random access resources from a base station. The configuration may indicate a quantity of a plurality of random access preambles, a quantity of a plurality of synchronization signal blocks (SSBs), and a quantity of random access preambles per SSB. The received configuration may indicate that each random access preamble of the plurality of random access preambles is available to the UE in the random access occasion for each SSB of a plurality of SSBs transmitted by the base station. The UE may select a random access preamble of the plurality of random access preambles based at least in part on the received configuration and transmit the selected random access preamble to the base station in the random access occasion.

A method of wireless communication at a UE is described. The method may include receiving, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station, selecting a random access preamble of the set of random access preambles based on the received configuration, and transmitting the selected random access preamble to the base station in the random access occasion.

An apparatus for wireless communication at a UE is described. The apparatus may include a processor, memory coupled with the processor, and instructions stored in the memory. The instructions may be executable by the processor to cause the apparatus to receive, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station, select a random access preamble of the set of random access preambles based on the received configuration, and transmit the selected random access preamble to the base station in the random access occasion.

Another apparatus for wireless communication at a UE is described. The apparatus may include means for receiving, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station, selecting a random access preamble of the set of random access preambles based on the received configuration, and transmitting the selected random access preamble to the base station in the random access occasion.

A non-transitory computer-readable medium storing code for wireless communication at a UE is described. The code may include instructions executable by a processor to receive, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station, select a random access preamble of the set of random access preambles based on the received configuration, and transmit the selected random access preamble to the base station in the random access occasion.

Some examples of the method, apparatuses, and non-transitory computer-readable medium described herein may further include operations, features, means, or instructions for receiving a synchronization signal block from the base station, where the random access preamble of the set of random access preambles may be selected regardless of an index of the received synchronization signal block.

In some examples of the method, apparatuses, and non-transitory computer-readable medium described herein, the received configuration may be a random access configuration common to a cell of the base station.

In some examples of the method, apparatuses, and non-transitory computer-readable medium described herein, receiving the configuration may include operations, features, means, or instructions for receiving the configuration via radio resource control signaling from the base station.

In some examples of the method, apparatuses, and non-transitory computer-readable medium described herein, the random access occasion may be one random access occasion and the quantity of the set of synchronization signal blocks associated with the one random access occasion may be thirty two.

In some examples of the method, apparatuses, and non-transitory computer-readable medium described herein, the random access occasion may be one random access occasion and the quantity of the set of synchronization signal blocks associated with the one random access occasion may be sixty four.

In some examples of the method, apparatuses, and non-transitory computer-readable medium described herein, a product of the quantity of the set of synchronization signal blocks per random access occasion and the quantity of random access preambles per synchronization signal block may be greater than sixty four.

Some examples of the method, apparatuses, and non-transitory computer-readable medium described herein may further include operations, features, means, or instructions for receiving, from the base station based on the received synchronization signal block, a random access response message in response to transmitting the selected random access preamble.

A method of wireless communication at a base station is described. The method may include transmitting, to a UE, a configuration of random access resources indicating a quantity of a set of random access preambles, a quantity of a set of synchronization signal blocks per random access occasion, and a quantity of random access preambles per synchronization signal block, the transmitted configuration indicating that each random access preamble of the set of random access preambles is available to the UE in the random access occasion for each synchronization signal block of a set of synchronization signal blocks transmitted by the base station and receiving, from the UE in the random access occasion, a random access preamble of the set of random access preambles.

An apparatus for wireless communication at a base station is described. The apparatus may include a processor, memory coupled with the processor, and instructions stored in the memory. The instructions may be executable by the processor to cause the apparatus to transmit, to a UE, a configuration of random access resources indicating a quantity of a set of random access preambles, a quantity of a set of synchronization signal blocks per random access occasion, and a quantity of random access preambles per synchronization signal block, the transmitted configuration indicating that each random access preamble of the set of random access preambles is available to the UE in the random access occasion for each synchronization signal block of a set of synchronization signal blocks transmitted by the base station and receive, from the UE in the random access occasion, a random access preamble of the set of random access preambles.

Another apparatus for wireless communication at a base station is described. The apparatus may include means for transmitting, to a UE, a configuration of random access resources indicating a quantity of a set of random access preambles, a quantity of a set of synchronization signal blocks per random access occasion, and a quantity of random access preambles per synchronization signal block, the transmitted configuration indicating that each random access preamble of the set of random access preambles is available to the UE in the random access occasion for each synchronization signal block of a set of synchronization signal blocks transmitted by the base station and receiving, from the UE in the random access occasion, a random access preamble of the set of random access preambles.

A non-transitory computer-readable medium storing code for wireless communication at a base station is described. The code may include instructions executable by a processor to transmit, to a UE, a configuration of random access resources indicating a quantity of a set of random access preambles, a quantity of a set of synchronization signal blocks per random access occasion, and a quantity of random access preambles per synchronization signal block, the transmitted configuration indicating that each random access preamble of the set of random access preambles is available to the UE in the random access occasion for each synchronization signal block of a set of synchronization signal blocks transmitted by the base station and receive, from the UE in the random access occasion, a random access preamble of the set of random access preambles.

Some examples of the method, apparatuses, and non-transitory computer-readable medium described herein may further include operations, features, means, or instructions for monitoring concurrently, during the random access occasion, for the set of random access preambles using a set of receive beams corresponding to the set of synchronization signal blocks, where one or more receive beams correspond to one synchronization signal block of the set of synchronization signal blocks.

Some examples of the method, apparatuses, and non-transitory computer-readable medium described herein may further include operations, features, means, or instructions for receiving, from a second UE in the random access occasion and on a second receive beam corresponding to a second synchronization signal block of the set of synchronization signal blocks, the random access preamble that was also received from the UE in the random access occasion, where the second synchronization signal block may be the same as a first synchronization block corresponding to a first receive beam, or the second synchronization signal block may be different from the first synchronization block.

Some examples of the method, apparatuses, and non-transitory computer-readable medium described herein may further include operations, features, means, or instructions for transmitting, based on receiving the random access preamble on the first receive beam, a first random access response message to the UE on a first transmit beam corresponding to the first synchronization signal block, and transmitting, based on receiving the random access preamble on the second receive beam, a second random access response message to the second UE on a second transmit beam corresponding to the second synchronization signal block, where the second synchronization signal block may be the same as the first synchronization block, or the second synchronization signal block may be different from the first synchronization block.

Some examples of the method, apparatuses, and non-transitory computer-readable medium described herein may further include operations, features, means, or instructions for determining a potential beam collision based on the first random access response message and the second random access response message, and transmitting, based on determining the beam collision, a message to the second UE that may be configured to prevent the second UE from decoding the first random access response message, where the message may be transmitted to the second UE concurrent with the transmission of the first random access response message to the UE.

Some examples of the method, apparatuses, and non-transitory computer-readable medium described herein may further include operations, features, means, or instructions for identifying the UE and the second UE based on a spatial separation of the first receive beam and the second receive beam.

In some examples of the method, apparatuses, and non-transitory computer-readable medium described herein, a product of the quantity of the set of synchronization signal blocks per random access occasion and the quantity of random access preambles per synchronization signal block may be greater than sixty four.

In some examples of the method, apparatuses, and non-transitory computer-readable medium described herein, the transmitted configuration may be a random access configuration common to a cell of the base station.

In some examples of the method, apparatuses, and non-transitory computer-readable medium described herein, transmitting the configuration may include operations, features, means, or instructions for transmitting the configuration via radio resource control signaling.

In some examples of the method, apparatuses, and non-transitory computer-readable medium described herein, the random access occasion may be one random access occasion and the quantity of the set of synchronization signal blocks associated with the one random access occasion may be thirty two.

In some examples of the method, apparatuses, and non-transitory computer-readable medium described herein, the random access occasion may be one random access occasion and the quantity of the set of synchronization signal blocks associated with the one random access occasion may be sixty four.

DETAILED DESCRIPTION

Figure 1:
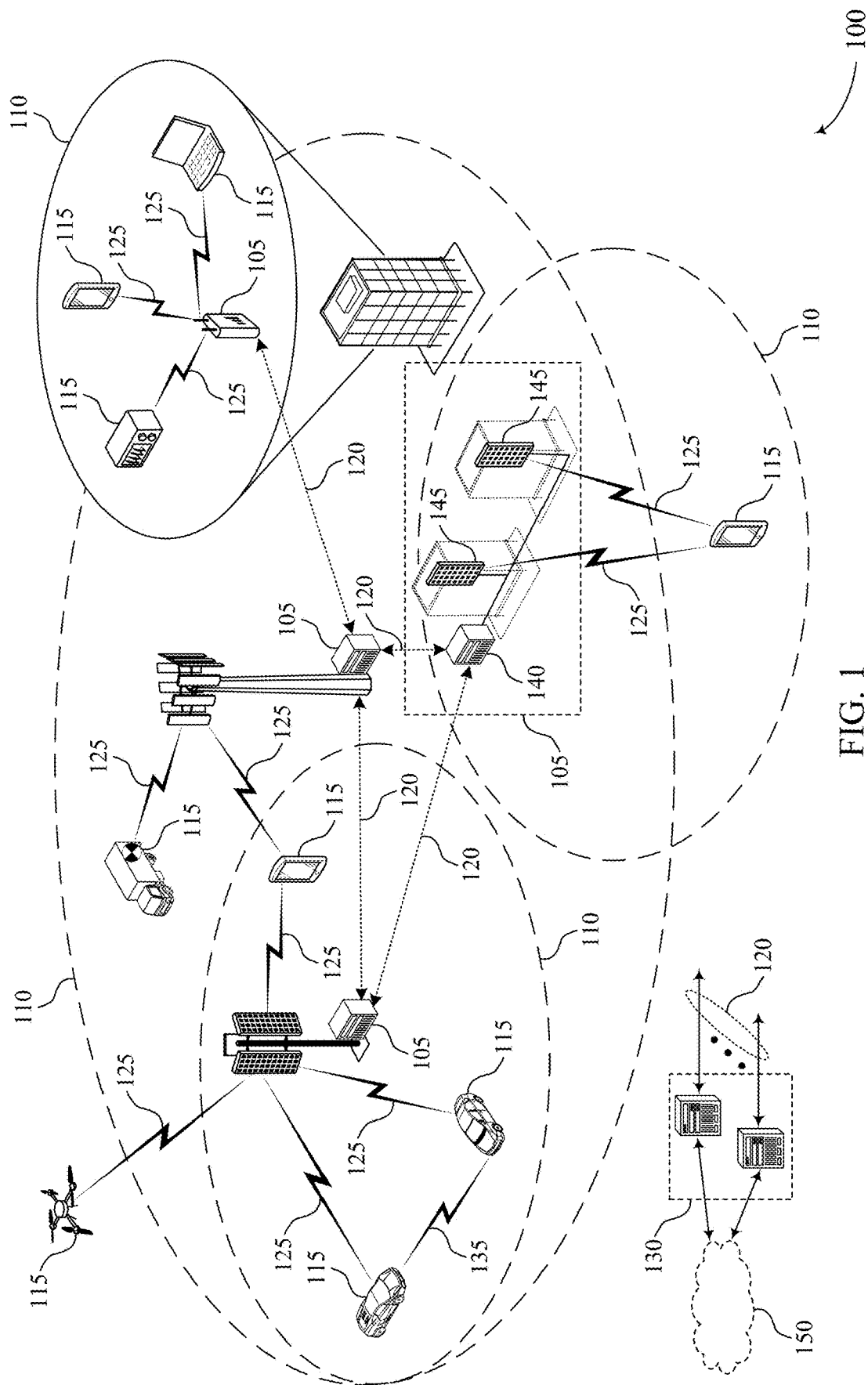
FIG. 1 illustrates an example of a system for wireless communications that supports random access preamble spatial overloading in accordance with aspects of the present disclosure.

In some wireless communications systems, a user equipment (UE) may be configured to transmit a signal to a base station in a random access channel (RACH) occasion. In some cases, the UE may be configured with an indication of a number of synchronization signal blocks (SSBs) per RACH occasion and a number of preambles per SSB. The UE may select a preamble and indicate the selected preamble in the signal that is transmitted to the base station in a RACH occasion and according to an SSB. The UE may receive a random access response (RAR) message from the base station in response to the transmitted preamble, and the RAR message may indicate an uplink resources for the UE and a random access preamble identifier (RAPID). In some cases, multiple UEs may transmit the same preamble in a RACH occasion. However, multiple UEs transmitting the same preamble in a RACH occasion may result in a preamble collision, which may increase system latency. For example, the UEs may perform additional signaling to the base station as part of a collision resolution procedure.

Various aspects of the present disclosure provide techniques for handling uplink transmissions in the context of preamble collisions, spatially separated beams, or RACH occasions. For example, a first UE may transmit a message that includes a preamble to a base station in a RACH occasion, and a second UE may transmit a message that includes the same preamble to the base station in the same RACH occasion. The base station may resolve the preamble collision and identify the first UE and the second UE based on spatially separating the received messages. The base station may transmit a first RAR message to the first UE and a second RAR message to the second UE. In some cases, the base station may transmit the first and second RAR messages simultaneously, while in some other cases, the base station may transmit the first RAR message to the first UE before transmitting the second RAR message to the second UE.

Such techniques may include selecting a random access preamble of a plurality of random access preambles. In such cases, a UE may receive a configuration from a base station, and the configuration may indicate a quantity of a plurality of random access preambles (e.g., totalNumberOfRA-Preambles), a quantity of a plurality of SSBs per random access occasion and a quantity of random access preambles per SSB (e.g., ssb-perRACH-OccasionAndCB-Preambles-PerSSB). The UE may select a random access preamble of the plurality of random access preambles per SSB and transmit a message indicating the selected preamble to the base station according to the SSB. The base station may receive the message and determine the direction from which the message was transmitted. For example, the base station may use techniques for spatial resolution of received signals to determine the direction from which the message was transmitted. In some implementations, these techniques may use a lens antenna or Butler matrix, but any suitable technique that spatially resolves the received signals may be used consistent with the techniques described herein. The base station may transmit a RAR message to the UE based on the direction from which the message was transmitted. Such techniques may improve preamble collision resolution procedures, thereby reducing system latency and the number of resources needed for random access procedures. For example, the described techniques may support the suitability of every RACH occasion for all UEs in a coverage area regardless of their spatial location and reduce RACH overhead by resolving RACH preamble collisions based on the spatial resolution of receive beams, thereby reducing RACH latency and decreasing RACH overhead.

Aspects of the disclosure are initially described in the context of wireless communications systems. Aspects of the disclosure are then described in the context of collision resolution techniques and a process flow. Aspects of the disclosure are further illustrated by and described with reference to apparatus diagrams, system diagrams, and flowcharts that relate to random access preamble spatial overloading.

FIG. 1 illustrates an example of a wireless communications system 100 that supports random access preamble spatial overloading in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
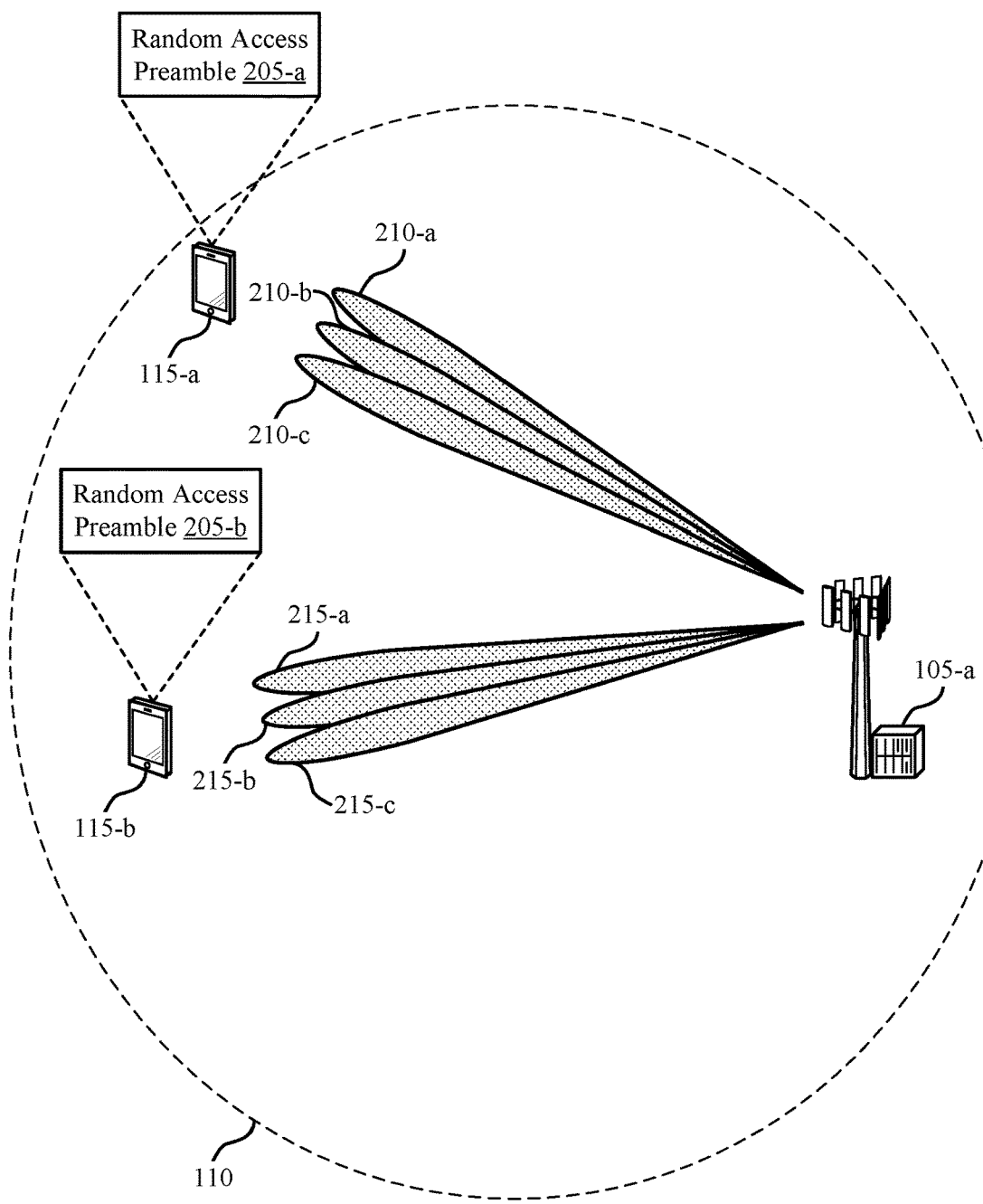
FIG. 2 illustrates an example of a wireless communications system that supports random access preamble spatial overloading in accordance with aspects of the present disclosure.

A UE 115 may receive a configuration of random access resources from a base station 105. The configuration may indicate a quantity of a plurality of random access preambles, a quantity of a plurality of SSBs, and a quantity of random access preambles per SSB. The received configuration may indicate that each random access preamble of the plurality of random access preambles is available to the UE 115 in the random access occasion for each SSB of a plurality of SSBs transmitted by the base station 105. The UE 115 may select a random access preamble of the plurality of random access preambles based at least in part on the received configuration and transmit the selected random access preamble to the base station 105 in the random access occasion FIG. 2 illustrates an example of a wireless communications system 200 that supports random access preamble spatial overloading in accordance with aspects of the present disclosure. In some examples, the wireless communications system 200 may implement aspects of wireless communication system 100. Wireless communications system 200 may include base station 105-a, UE 115-a, and UE 115-b, which may be examples of a base station 105 and a UE 115 as described with reference to FIG. 1. Base station 105-a may be associated with a number of coverage area 110, and UE 115-a and UE 115-b may communicate with one or more base stations 105. For example, UE 115-a may transmit random access preamble 205-a to base station 105-a via the beams 210, and UE 115-b may transmit random access preamble 205-b to base station 105-a via the beams 215.

Base station 105-a may transmit a configuration of random access resources to UE 115-a and UE 115-b. In some cases, the configuration may include one or more options that include a multiple SSBs per RACH occasion and multiple preambles per SSB. For example, a single RACH occasion may include 32 or 64 SSBs, and each SSB may be associated with 4, 8, 12, 16, 20, 24, 28, 32, 36, 40, 44, 48, 52, 56, 60, or 64 preambles. An example field format is provided below in Example Field Format 1.

```
RACH-ConfigConnnnon ::= SEQUENCE {
    rach-ConfigGeneric RACH-ConfigGeneric,
    totalNunnberOfRA-Preambles INTEGER (1..63) OPTIONAL,
    ssb-perRACH-OccasionAndCB-PreamblesPerSSB CHOICE {
        oneEighth ENUMERATED
            {n4,n8,n12,n16,n20,n24,n28,n32,n36,n40,n44,n48,n52,n56,n60,n64},
        oneFourth ENUMERATED
            {n4,n8,n12,n16,n20,n24,n28,n32,n36,n40,n44,n48,n52,n56,n60,n64},
        oneHalf ENUMERATED
            {n4,n8,n12,n16,n20,n24,n28,n32,n36,n40,n44,n48,n52,n56,n60,n64},
        one ENUMERATED
            {n4,n8,n12,n16,n20,n24,n28,n32,n36,n40,n44,n48,n52,n56,n60,n64},
        two ENUMERATED {n4,n8,n12,n16,n20,n24,n28,n32},
        four INTEGER (1..16),
        eight INTEGER (1..8),
        sixteen INTEGER (1..4),
        thirtyTwo ENUMERATED
            {n4,n8,n12,n16,n20,n24,n28,n32,n36,n40,n44,n48,n52,n56,n60,n64},
        sixtyFour ENUMERATED
            {n4,n8,n12,n16,n20,n24,n28,n32,n36,n40,n44,n48,n52,n56,n60,n64},
    }
}
```

Example Field Format 1

The UEs 115 may select the random access preambles 205 based on an indicated configuration. For example, base station 105-a may signal a first configuration to UE 115-a and a second configuration to UE 115-b. UE 115-a may select random access preamble 205-a based on the first configuration and in accordance with the field format, and UE 115-b may select random access preamble 205-b based on the second configuration and in accordance with the field format. UE 115-a may transmit random access preamble 205-a on an uplink beam (e.g., a single wise uplink beam) and base station 105-a may receive random access preamble 205-a on receive beams (e.g., multiple narrow receive beams). Base station 105-a may receive random access preamble 205-a on receive beam 210-a, receive beam 210-b, and receive beam 210-c, and base station 105-a may determine the direction from which UE 115-a transmitted random access preamble 205-a based on the receive beams 210. Base station 105-a may receive random access preamble 205-b on receive beam 215-a, receive beam 215-b, and receive beam 215-c, and base station 105-a may determine the direction from which UE 115-b transmitted random access preamble 205-b based on the receive beams 215.

In some cases, random access preamble 205-a may be the same as preamble 205-b may be transmitted to base station 105-a in a single random access occasion. Base station 105-a may identify a preamble collision and resolve the preamble collision based on the receive beams 210, the receive beams 215, spatial separation, or any combination thereof. Resolving the preamble collision may avoid additional signaling with the UEs 115, which may reduce latency and system resource use.

The use of technologies to spatially resolve signals received by base station 105-a may overcome the single beam per base station limitation associated with phased array based base stations. A lens antenna may be one example of an implementation to translate the position of a radiating element at the focal plane to an angle at which a beam is transmitted, or from which the beam is received. In some cases, multiple radiating elements may be operated simultaneously, without the need to control the phases of multiple elements to form a beam, to support transmitting or receiving multiple beams in parallel. A Butler matrix may be another example of an implementation to translate the position of a radiating element at the focal plane to an angle at which a beam is transmitted, or from which the beam is received. In some cases, each port of the Butler matrix may be translated to a set of directional beams (e.g., directional discrete Fourier transform (DFT) beams). Using such technologies may support base station 105-a in sensing or determining the direction from which a UE 115 is transmitting and associating or identifying a serving beam of the UE 115. Such technologies may reduce the beam sweeping performed by base station 105-a, thereby reducing system latency.

Base station 105-a may transmit a first RAR message to UE 115-a based on receiving random access preamble 205-a and a second RAR message to UE 115-b based on receiving random access preamble 205-b. The first RAR message may indicate a first uplink grant, a first timing advance, and a first RAPID, while the second RAR message may indicate a second uplink grant, a second timing advance, and a second RAPID. The first RAPID may be the same as the second RAPID, but the first uplink grant may be different from the second uplink grant and the first timing advance may be different from the second timing advance.

Base station 105-a may transmit the first RAR and the second RAR simultaneously on narrow beams with high spatial separation. In some cases, base station 105-a may transmit RAR messages to multiple UEs 115 in both a spatial division multiplexing (SDM) manner and a time division multiplexing (TDM) manner (e.g., using multiple slots during a RAR window period, each slot corresponding to a different UE group). In some cases, wireless communications system 200 may support up to 64 RACH sequences (e.g., preambles) per SSB, which may support an increased number of users and/or UEs 115.

Figure 3:
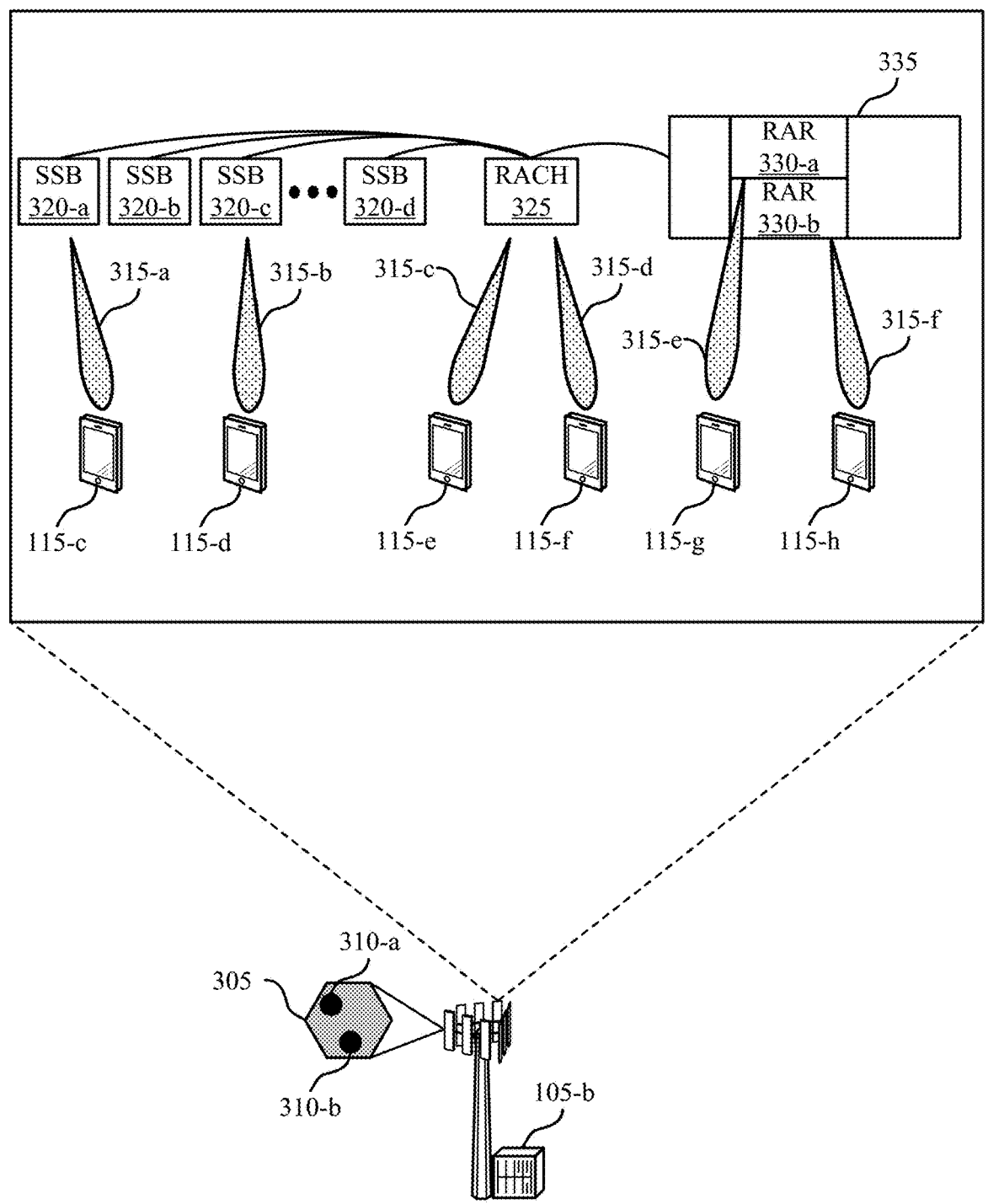
FIG. 3 illustrates an example of a preamble collision resolution technique that supports random access preamble spatial overloading in accordance with aspects of the present disclosure.

FIG. 3 illustrates an example of a preamble collision resolution technique 300 that supports random access preamble spatial overloading in accordance with aspects of the present disclosure. In some examples, the preamble collision resolution technique 300 may implement aspects of wireless communication system 100 or 200. The preamble collision resolution technique 300 may illustrate a preamble collision resolution technique for scenarios with spatial separation.

Base station 105-b may be include or be otherwise associated with an antenna (e.g., a lens antenna) 305, and the antenna may indicate first receive beam 310-a and second receive beam 310-b. In some cases, first receive beam 310-a may correspond to a first UE 115, and second receive beam 310-b may correspond to a second UE 115. In some cases, UE 115-c, UE 115-e, and UE 115-g may correspond to the same UE (e.g., the first UE), and UE 115-d, UE 115-f, and UE 115-h may correspond to the same UE (e.g., the second UE). Base station 105-b may determine that multiple UEs correspond to the receive beams 310 and that the receive beams 310 correspond to spatially separated beams.

Base station 105-b may transmit a number of SSBs 320 (e.g., SSB 320-a, SSB 320-b, SSB 320-c, and SSB 320-d) to a number of UEs 115 (e.g., UE 115-c and UE 115-d). For example, base station 105-b may transmit SSB 320-a to UE 115-c (e.g., the first UE) via beam 315-a and SSB 320-c to UE 115-d (e.g., the second UE) via beam 315-b. UE 115-e (e.g., the first UE) may select a random access preamble based on the SSB 320-a and transmit the random access preamble to base station 105-b via beam 315-c in the RACH occasion 325. UE 115-f (e.g., the second UE) may select the same random access preamble based on the SSB 320-c and transmit the random access preamble to base station 105-b via beam 315-d in the RACH occasion 325. Base station 105-a may transmit multiple RAR messages during the RAR window 335. In some examples, base station 105-b may transmit RAR message 330-a to UE 115-g via beam 315-e and RAR message 330-b to UE 115-h via beam 315-f. Beams 315-e and 315-f may be spatially separated beams, MU-MIMO beams, or the like.

In some cases, RAR message 330-a and RAR message 330-b may indicate the same RAPID. For example, the MAC subheader of RAR message 330-a may indicate a RAPID that is the same as the RAPID indicated in the MAC subheader of RAR message 330-b. The RAPID indicated in a RAR message 330 may be based on a received random access preamble, and a base station 105 may transmit multiple RAR messages to multiple corresponding UEs 115 using spatially separated beams. The RAR message 330-a may indicate a first timing advance and a first uplink grant, and the RAR message 330-b may indicate a second timing advance different from the first time response and a second uplink grant different from the first uplink grant. Base station 105-b may transmit the RAR message 330 messages in simultaneously (e.g., in parallel), which may improve system efficiency and reduce latency.

Figure 4:
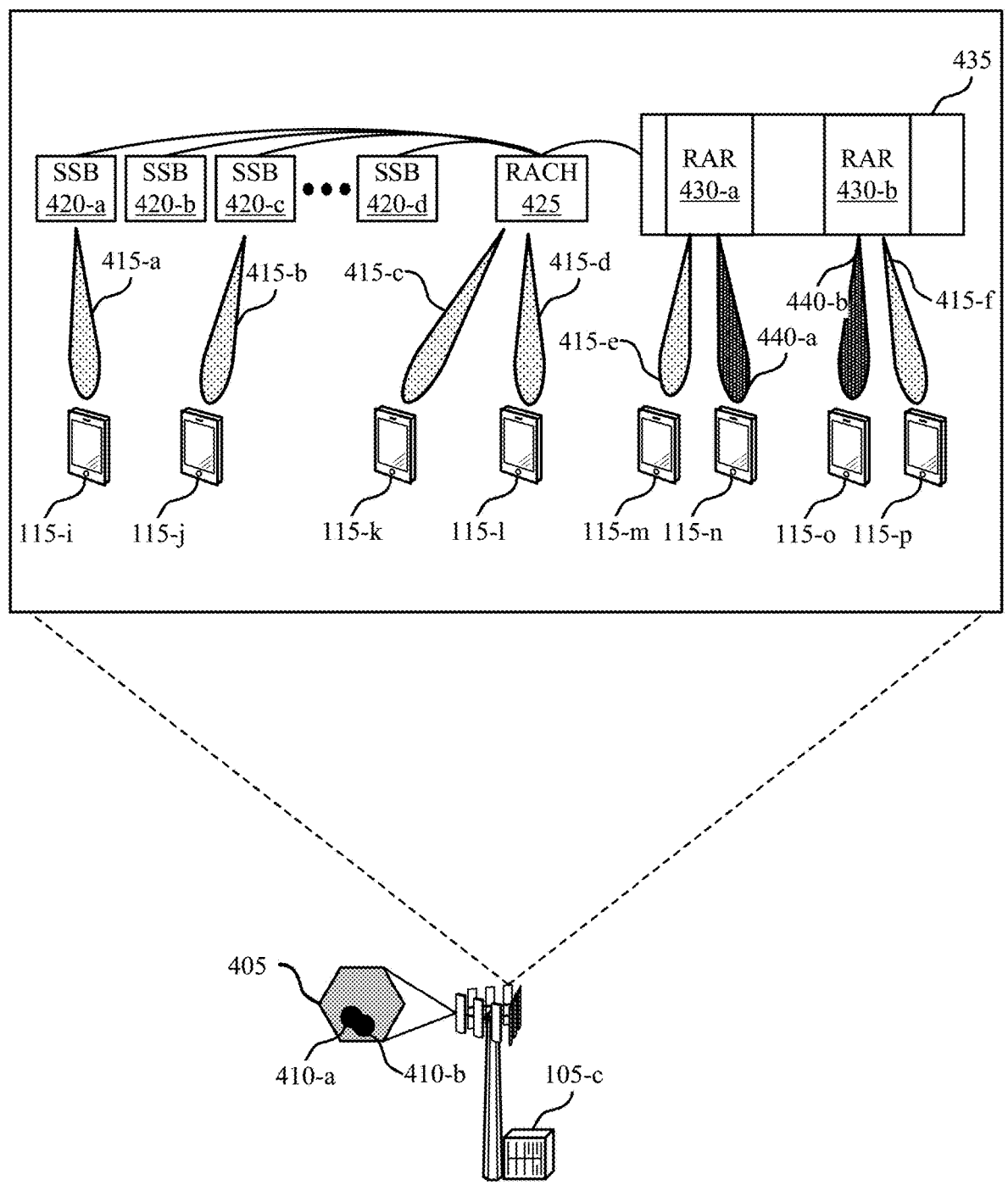
FIG. 4 illustrates an example of a preamble collision resolution technique that supports random access preamble spatial overloading in accordance with aspects of the present disclosure.

FIG. 4 illustrates an example of a preamble collision resolution technique 400 that supports random access preamble spatial overloading in accordance with aspects of the present disclosure. In some examples, the preamble collision resolution technique 400 may implement aspects of wireless communication system 100 or 200. The preamble collision resolution technique 400 may illustrate a preamble collision resolution technique for scenarios with partial spatial separation.

Base station 105-c may be include or be otherwise associated with an antenna (e.g., a lens antenna) 405, and the antenna may indicate first receive beam 410-a and second receive beam 410-b. In some cases, first receive beam 410-a may correspond to a first UE 115, and second receive beam 410-b may correspond to a second UE 115. In some cases, UE 115-i, UE 115-k, and UE 115-m may correspond to the same UE (e.g., the first UE), and UE 115-j, UE 115-l, and UE 115-n may correspond to the same UE (e.g., the second UE). Base station 105-c may determine that multiple UEs correspond to the receive beams 410 and that the receive beams 410 correspond to partially spatially separated beams.

Base station 105-c may transmit a number of SSBs 420 (e.g., SSB 420-a, SSB 420-b, SSB 420-c, and SSB 420-d) to a number of UEs 115 (e.g., UE 115-i and UE 115-j). For example, base station 105-c may transmit SSB 420-a to UE 115-i (e.g., the first UE) via beam 415-a and SSB 420-c to UE 115-j (e.g., the second UE) via beam 415-b. UE 115-k (e.g., the first UE) may select a random access preamble based on the SSB 420-a and transmit the random access preamble to base station 105-c via beam 415-c in the RACH occasion 425. UE 115-l (e.g., the second UE) may select the same random access preamble based on the SSB 420-c and transmit the random access preamble to base station 105-c via beam 415-d in the RACH occasion 425.

In some cases, base station 105-c may transmit multiple RAR messages during the RAR window 435. For example, base station 105-c may transmit RAR message 430-a to UE 115-m via beam 415-e while simultaneously transmitting interfering signal 440-a to UE 115-n. The interfering signal 440-a may prevent UE 115-n from decoding RAR message 430-a, which may improve system performance, as the RAR message 430-a is intended for UE 115-m. Base station 105-c may transmit RAR message 430-b to UE 115-p via beam 415-f while simultaneously transmitting interfering signal 440-b to UE 115-o. The interfering signal 440-b may prevent UE 115-o from decoding RAR message 430-b, which may improve system performance, as the RAR message 430-b is intended for UE 115-p. Beam 415-e may be spatially aimed at UE 115-m, beam 415-f may be spatially aimed at UE 115-p, interfering signal 440-a may be spatially aimed at UE 115-n, and interfering signal 440-b may be spatially aimed at UE 115-o. In some cases, an interfering signal 440 may be transmitted only on CCEs of an RA-RNTI PDDCH, which may prevent unintended UE1 from successfully decoding the RAR PDCCH.

Figure 5:
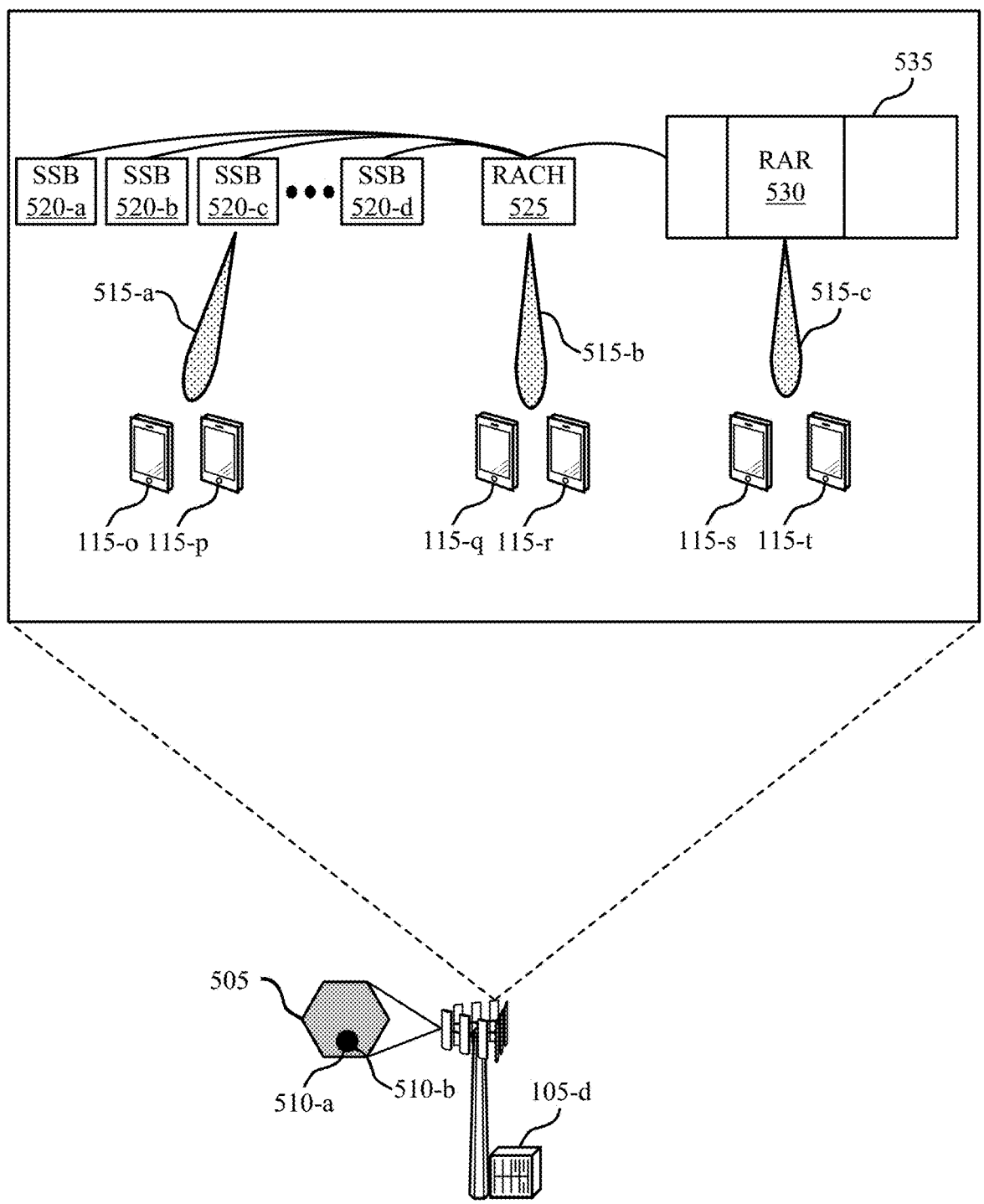
FIG. 5 illustrates an example of a preamble collision resolution technique that supports random access preamble spatial overloading in accordance with aspects of the present disclosure.

FIG. 5 illustrates an example of a preamble collision resolution technique 500 that supports random access preamble spatial overloading in accordance with aspects of the present disclosure. In some examples, the preamble collision resolution technique 500 may implement aspects of wireless communication system 100 or 200. The preamble collision resolution technique 500 may illustrate a preamble collision resolution technique for scenarios without spatial separation.

Base station 105-d may be include or be otherwise associated with an antenna (e.g., a lens antenna) 505, and the antenna may indicate first receive beam 510-a and second receive beam 510-b. In some cases, first receive beam 510-a may correspond to a first UE 115, and second receive beam 510-b may correspond to a second UE 115. In some cases, UE 115-0, UE 115-q, and UE 115-s may correspond to the same UE (e.g., the first UE), and UE 115-p, UE 115-r, and UE 115-t may correspond to the same UE (e.g., the second UE). Base station 105-d may determine that base station 105-d cannot produce fully separated beams or fail to identify that multiple UEs correspond to the receive beams 510.

Base station 105-d may transmit a number of SSBs 520 (e.g., SSB 520-a, SSB 520-b, SSB 520-c, and SSB 520-d) to a number of UEs 115 (e.g., UE 115-o and UE 115-p). For example, base station 105-d may transmit SSB 520-c to UE 115-o (e.g., the first UE) and UE 115-p via beam 515-a. UE 115-q (e.g., the first UE) may select a random access preamble based on the SSB 520-a and transmit the random access preamble to base station 105-d via beam 515-b in the RACH occasion 525. UE 115-r (e.g., the second UE) may select the same random access preamble based on the SSB 520-c and transmit the random access preamble to base station 105-d via beam 515-b in the RACH occasion 525. Base station 105-d may transmit a RAR message during the RAR window 535. In some examples, base station 105-d may transmit RAR message 530 to UE 115-s and UE 115-t via beam 515-c. UE 115-s and/or UE 115-t may transmit an additional random access message to base station 105-d as part of a preamble collision resolution procedure. For example, a UE 115 may transmit a collision resolution message (e.g., Msg 4 of a RACH procedure, a UE contention resolution identity MAC-CE, etc.) to base station 105-d as part of a preamble collision resolution procedure.

Figure 6:
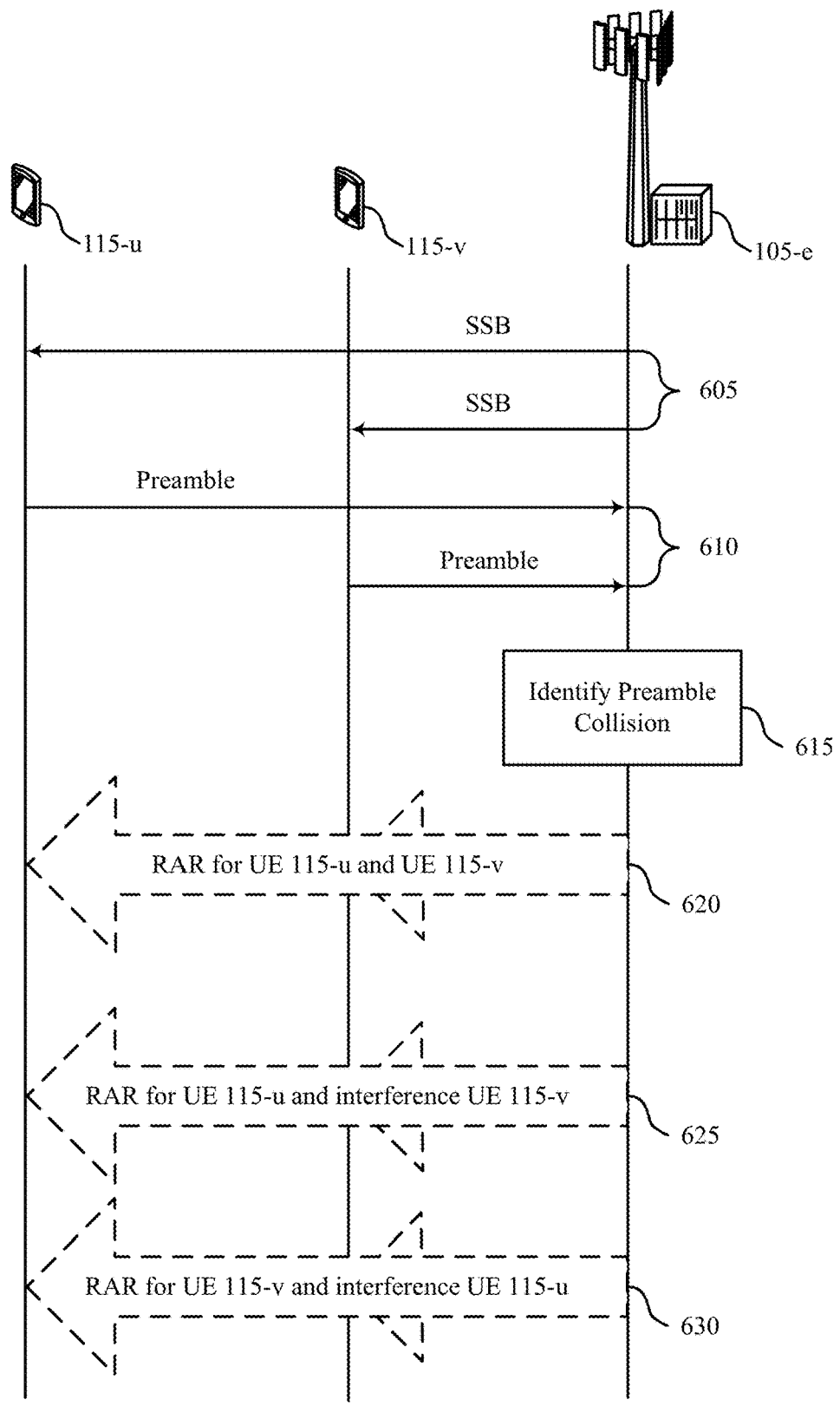
FIG. 6 illustrates an example of a process flow that supports random access preamble spatial overloading in accordance with aspects of the present disclosure.

FIG. 6 illustrates an example of a process flow 600 that supports random access preamble spatial overloading in accordance with aspects of the present disclosure. In some examples, process flow 600 may implement aspects of wireless communication system 100 or 200. The process flow 600 includes UE 115-u, UE 115-v, and base station 105-e, which may be examples of the corresponding devices as described with reference to FIGS. 1 through 5. Base station 105-e may resolve random access preamble collisions through the spatial analysis of receive beams. Alternative examples of the following may be implemented, where some steps are performed in a different order than described or are not performed at all. In some cases, steps may include additional features not mentioned below, or further steps may be added.

At 605, base station 105-e may transmit an indication of an SSB to UE 115-u and an indication of an SSB to UE 115-v. At 610, base station 105-e may receive a random access preamble from UE 115-u and UE 115-v.

At 615, base station 105-e may determine whether the random access preamble received from UE 115-u collides (e.g., is the same as) the random access preamble received from UE 115-v. In some cases, at 615, base station 105-e may identify that the random access preamble received from UE 115-u does collide with the random access preamble received from UE 115-v. In some cases, at 615, base station 105-e may determine whether the random access preamble can be resolved with spatial separation.

In some examples, UE 105-e may perform 620 based on determining that there is sufficient spatial separation between the receive been corresponding to UE 115-u and the receive beam corresponding to UE 115-v, while in some additional or alternative examples, base station 105-e may perform 625 and 630 based on determining that there is partial spatial separation between the receive beam corresponding to UE 115-u and the receive beam corresponding to UE 115-v.

At 620, base station 105-e may transmit a first RAR message to UE 115-u via a first beam while simultaneously transmitting a second RAR to UE 115-v via a second beam. The first RAR message may include the preamble (e.g., a RAPID), a first timing advance, and a first uplink grant. The second RAR message may include the preamble (e.g., a RAPID), a second timing advance different from the first timing advance, and a second uplink grant different from the first uplink grant.

At 625, base station may transmit a first RAR to UE 115-u while simultaneously transmitting an interference signal to UE 115-v. The interference signal prevent UE 115-v from decoding the first RAR.

At 630, base station may transmit an interference signal to UE 115-u while simultaneously transmitting a second RAR to UE 115-v. The interference signal prevent UE 115-u from decoding the second RAR.

Figure 7:
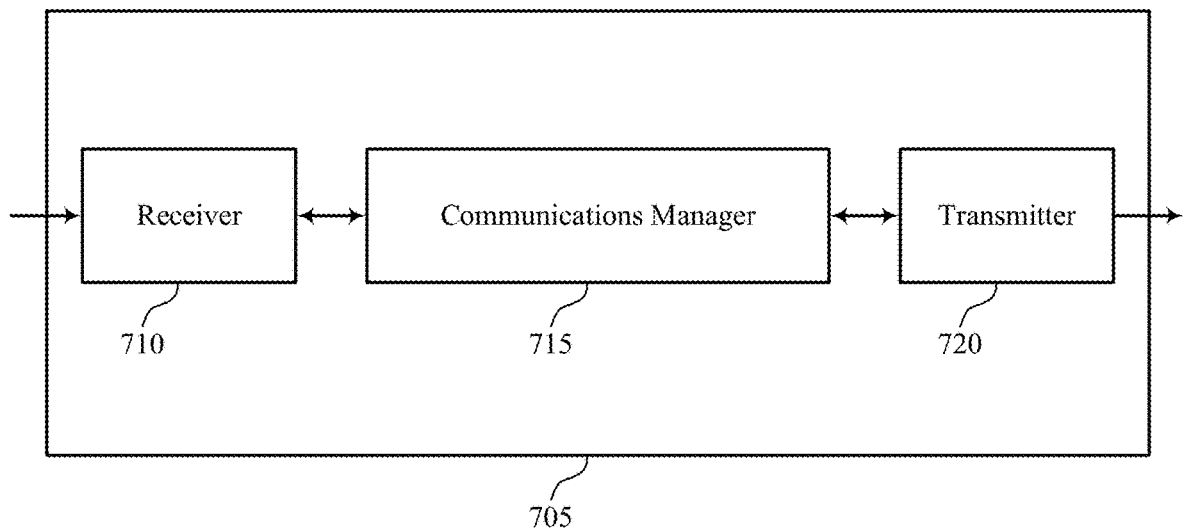
FIGS. 7 and 8 show block diagrams of devices that support random access preamble spatial overloading in accordance with aspects of the present disclosure.

FIG. 7 shows a block diagram 700 of a device 705 that supports random access preamble spatial overloading in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to random access preamble spatial overloading, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station, select a random access preamble of the set of random access preambles based on the received configuration, and transmit the selected random access preamble to the base station in the random access occasion. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
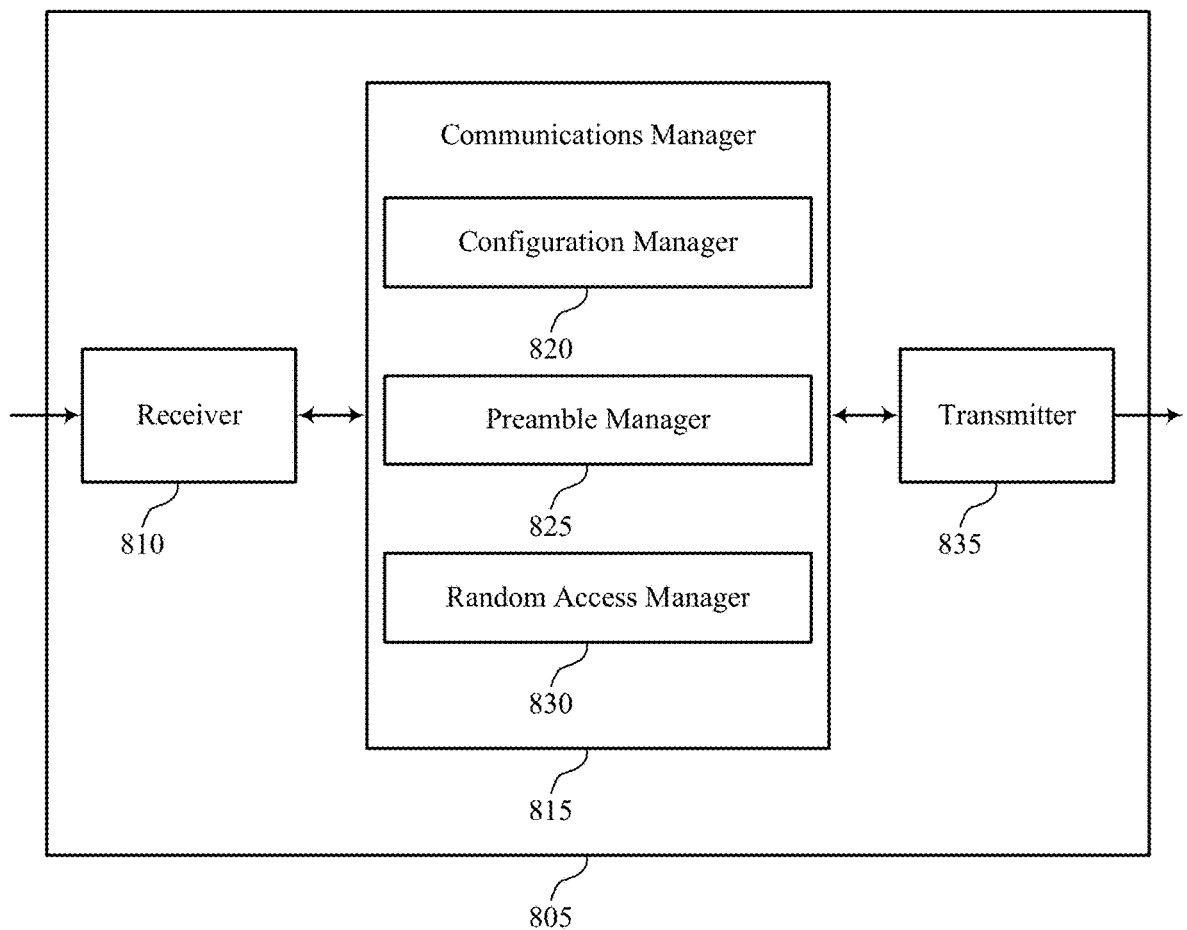

FIG. 8 shows a block diagram 800 of a device 805 that supports random access preamble spatial overloading in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to random access preamble spatial overloading, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration manager 820, a preamble manager 825, and a random access manager 830. The communications manager 815 may be an example of aspects of the communications manager 1010 described herein.

The configuration manager 820 may receive, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station.

The preamble manager 825 may select a random access preamble of the set of random access preambles based on the received configuration.

The random access manager 830 may transmit the selected random access preamble to the base station in the random access occasion.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
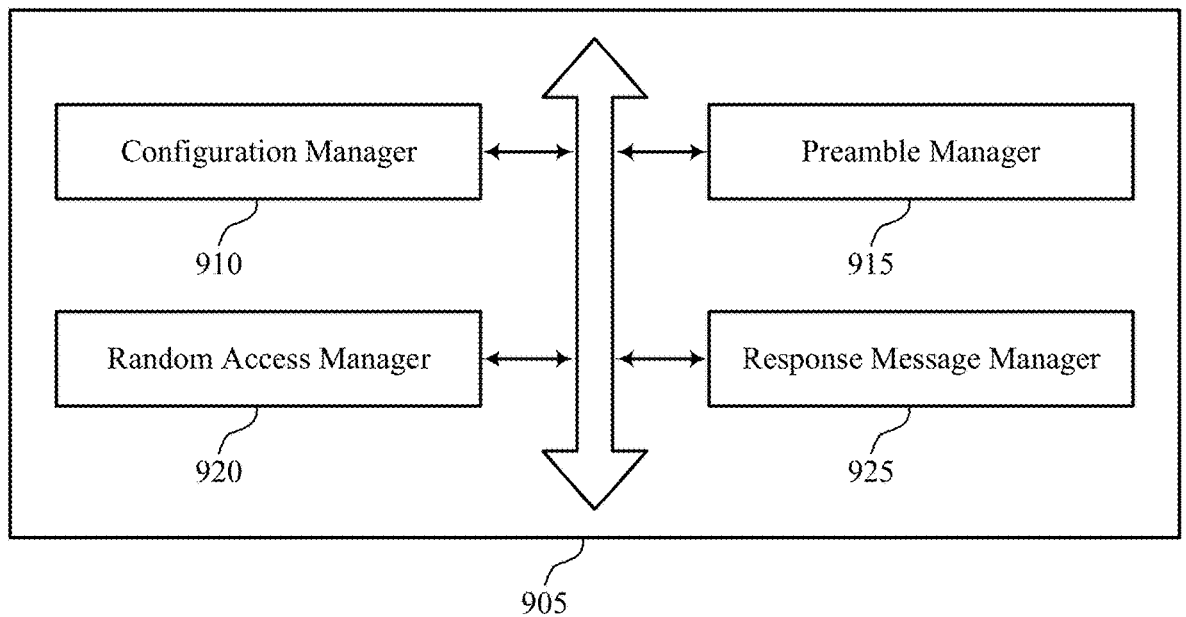
FIG. 9 shows a block diagram of a communications manager that supports random access preamble spatial overloading in accordance with aspects of the present disclosure.

FIG. 9 shows a block diagram 900 of a communications manager 905 that supports random access preamble spatial overloading in accordance with aspects of the present disclosure. The communications manager 905 may be an example of aspects of a communications manager 715, a communications manager 815, or a communications manager 1010 described herein. The communications manager 905 may include a configuration manager 910, a preamble manager 915, a random access manager 920, and a response message manager 925. Each of these modules may communicate, directly or indirectly, with one another (e.g., via one or more buses).

The configuration manager 910 may receive, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station.

In some examples, the configuration manager 910 may receive the configuration via radio resource control signaling from the base station.

In some cases, the received configuration is a random access configuration common to a cell of the base station.

The preamble manager 915 may select a random access preamble of the set of random access preambles based on the received configuration.

In some examples, the preamble manager 915 may receive a synchronization signal block from the base station, where the random access preamble of the set of random access preambles is selected regardless of an index of the received synchronization signal block.

The random access manager 920 may transmit the selected random access preamble to the base station in the random access occasion.

In some cases, the random access occasion is one random access occasion and the quantity of the set of synchronization signal blocks associated with the one random access occasion is thirty two.

In some cases, the random access occasion is one random access occasion and the quantity of the set of synchronization signal blocks associated with the one random access occasion is sixty four.

In some cases, a product of the quantity of the set of synchronization signal blocks per random access occasion and the quantity of random access preambles per synchronization signal block is greater than sixty four.

The response message manager 925 may receive, from the base station based on the received synchronization signal block, a random access response message in response to transmitting the selected random access preamble.

Figure 10:
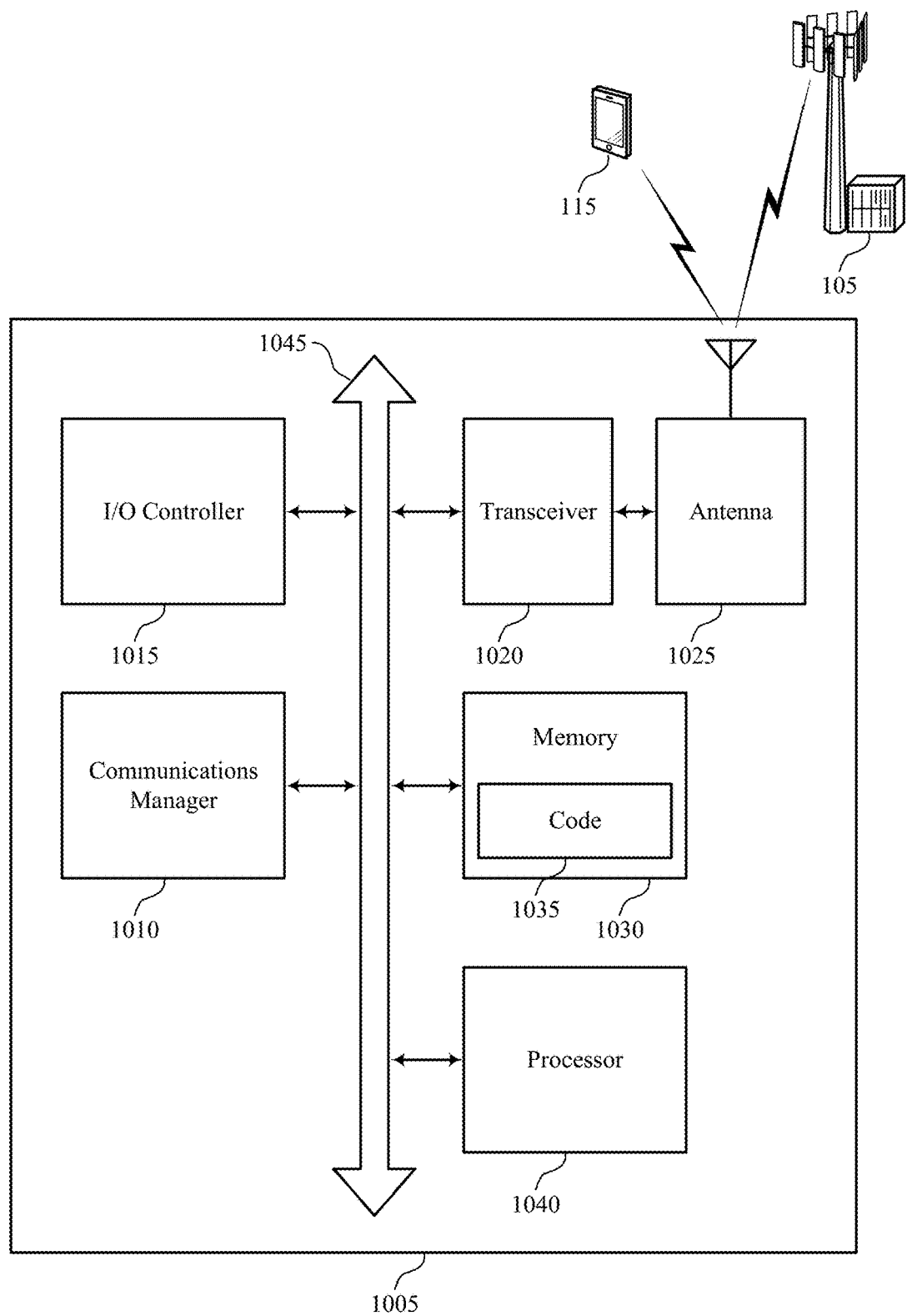
FIG. 10 shows a diagram of a system including a device that supports random access preamble spatial overloading in accordance with aspects of the present disclosure.

FIG. 10 shows a diagram of a system 1000 including a device 1005 that supports random access preamble spatial overloading in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station, select a random access preamble of the set of random access preambles based on the received configuration, and transmit the selected random access preamble to the base station in the random access occasion.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting random access preamble spatial overloading).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
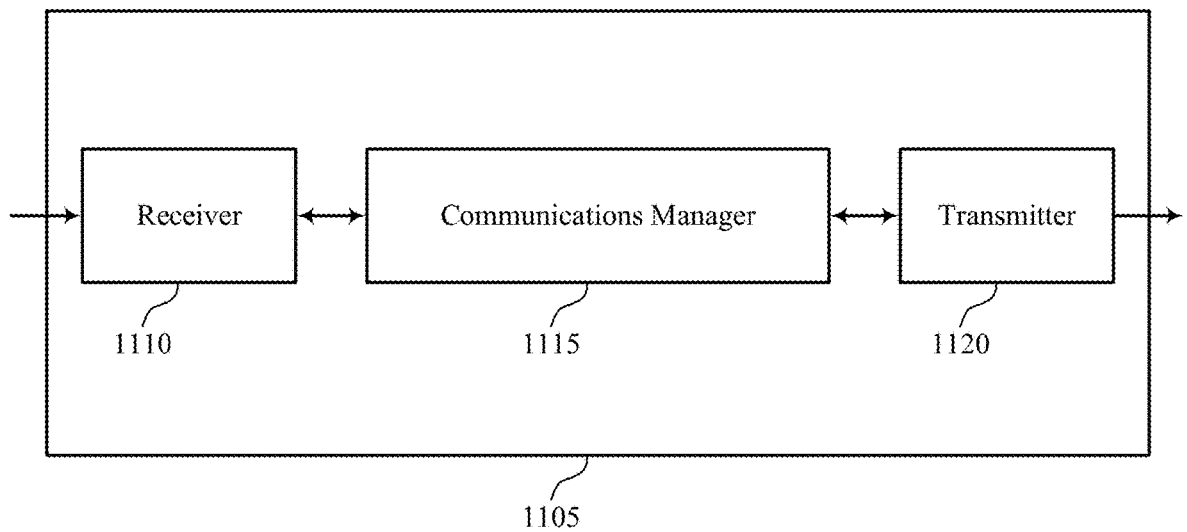
FIGS. 11 and 12 show block diagrams of devices that support random access preamble spatial overloading in accordance with aspects of the present disclosure.

FIG. 11 shows a block diagram 1100 of a device 1105 that supports random access preamble spatial overloading in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to random access preamble spatial overloading, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a configuration of random access resources indicating a quantity of a set of random access preambles, a quantity of a set of synchronization signal blocks per random access occasion, and a quantity of random access preambles per synchronization signal block, the transmitted configuration indicating that each random access preamble of the set of random access preambles is available to the UE in the random access occasion for each synchronization signal block of a set of synchronization signal blocks transmitted by the base station and receive, from the UE in the random access occasion, a random access preamble of the set of random access preambles. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
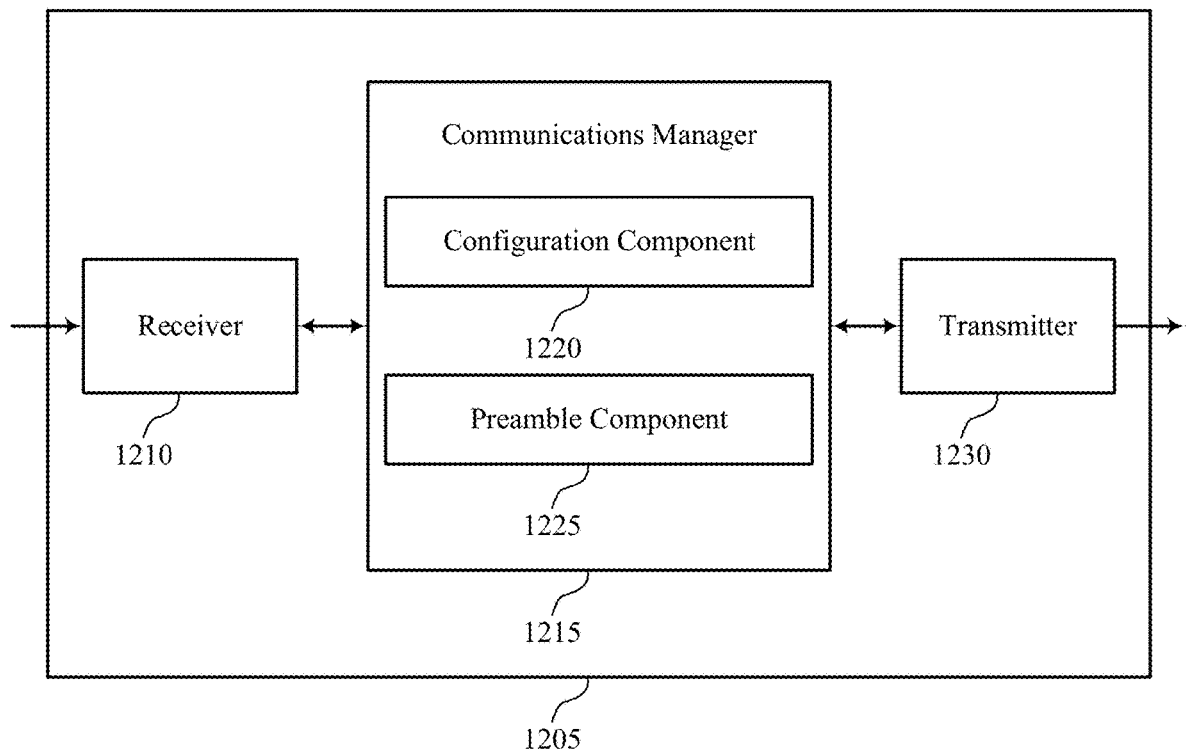

FIG. 12 shows a block diagram 1200 of a device 1205 that supports random access preamble spatial overloading in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to random access preamble spatial overloading, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration component 1220 and a preamble component 1225. The communications manager 1215 may be an example of aspects of the communications manager 1410 described herein.

The configuration component 1220 may transmit, to a UE, a configuration of random access resources indicating a quantity of a set of random access preambles, a quantity of a set of synchronization signal blocks per random access occasion, and a quantity of random access preambles per synchronization signal block, the transmitted configuration indicating that each random access preamble of the set of random access preambles is available to the UE in the random access occasion for each synchronization signal block of a set of synchronization signal blocks transmitted by the base station.

The preamble component 1225 may receive, from the UE in the random access occasion, a random access preamble of the set of random access preambles.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
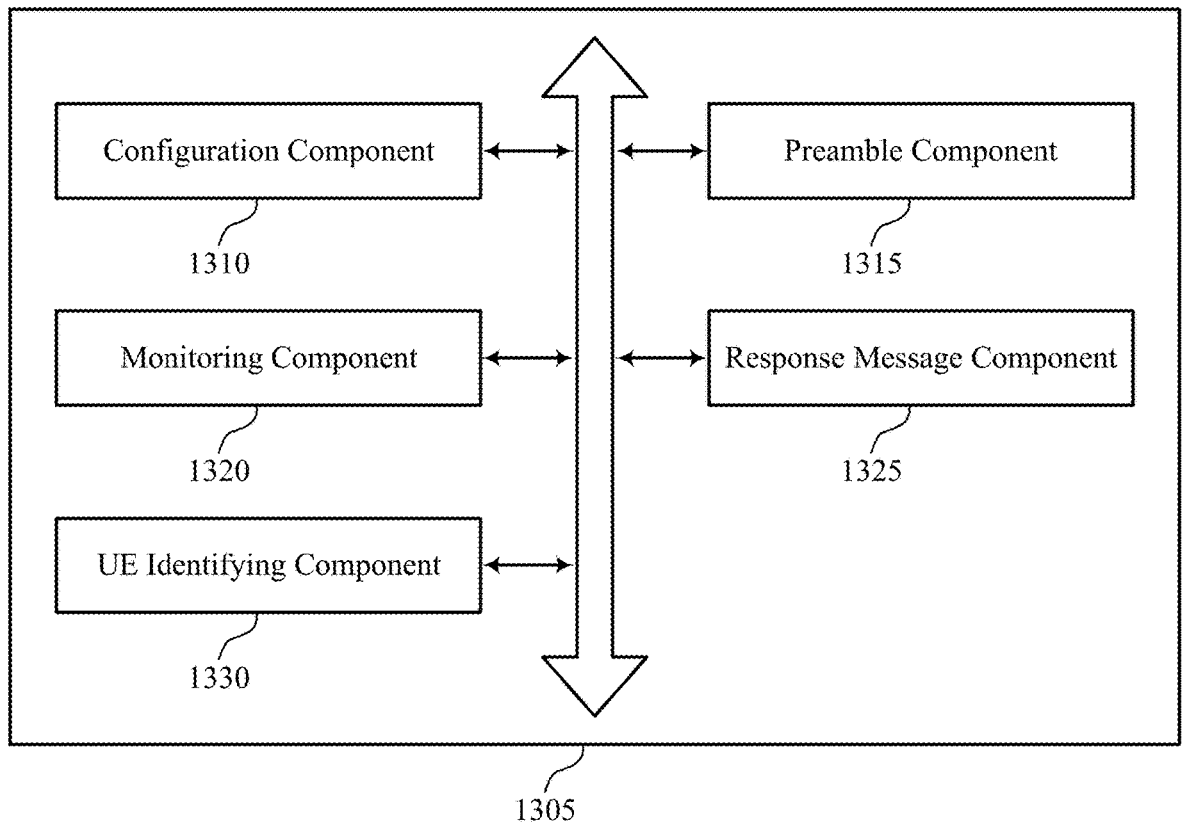
FIG. 13 shows a block diagram of a communications manager that supports random access preamble spatial overloading in accordance with aspects of the present disclosure.

FIG. 13 shows a block diagram 1300 of a communications manager 1305 that supports random access preamble spatial overloading in accordance with aspects of the present disclosure. The communications manager 1305 may be an example of aspects of a communications manager 1115, a communications manager 1215, or a communications manager 1410 described herein. The communications manager 1305 may include a configuration component 1310, a preamble component 1315, a monitoring component 1320, a response message component 1325, and an UE identifying component 1330. Each of these modules may communicate, directly or indirectly, with one another (e.g., via one or more buses).

The configuration component 1310 may transmit, to a UE, a configuration of random access resources indicating a quantity of a set of random access preambles, a quantity of a set of synchronization signal blocks per random access occasion, and a quantity of random access preambles per synchronization signal block, the transmitted configuration indicating that each random access preamble of the set of random access preambles is available to the UE in the random access occasion for each synchronization signal block of a set of synchronization signal blocks transmitted by the base station.

In some examples, the configuration component 1310 may transmit the configuration via radio resource control signaling.

In some cases, a product of the quantity of the set of synchronization signal blocks per random access occasion and the quantity of random access preambles per synchronization signal block is greater than sixty four.

In some cases, the transmitted configuration is a random access configuration common to a cell of the base station.

In some cases, the random access occasion is one random access occasion and the quantity of the set of synchronization signal blocks associated with the one random access occasion is thirty two.

In some cases, the random access occasion is one random access occasion and the quantity of the set of synchronization signal blocks associated with the one random access occasion is sixty four.

The preamble component 1315 may receive, from the UE in the random access occasion, a random access preamble of the set of random access preambles.

In some examples, the preamble component 1315 may receive, from a second UE in the random access occasion and on a second receive beam corresponding to a second synchronization signal block of the set of synchronization signal blocks, the random access preamble that was also received from the UE in the random access occasion, where the second synchronization signal block is the same as a first synchronization block corresponding to a first receive beam, or the second synchronization signal block is different from the first synchronization block.

The monitoring component 1320 may monitor concurrently, during the random access occasion, for the set of random access preambles using a set of receive beams corresponding to the set of synchronization signal blocks, where one or more receive beams correspond to one synchronization signal block of the set of synchronization signal blocks.

The response message component 1325 may transmit, based on receiving the random access preamble on the first receive beam, a first random access response message to the UE on a first transmit beam corresponding to the first synchronization signal block.

In some examples, the response message component 1325 may transmit, based on receiving the random access preamble on the second receive beam, a second random access response message to the second UE on a second transmit beam corresponding to the second synchronization signal block, where the second synchronization signal block is the same as the first synchronization block, or the second synchronization signal block is different from the first synchronization block.

In some examples, the response message component 1325 may determine a potential beam collision based on the first random access response message and the second random access response message.

In some examples, the response message component 1325 may transmit, based on determining the beam collision, a message to the second UE that is configured to prevent the second UE from decoding the first random access response message, where the message is transmitted to the second UE concurrent with the transmission of the first random access response message to the UE.

The UE identifying component 1330 may identify the UE and the second UE based on a spatial separation of the first receive beam and the second receive beam.

Figure 14:
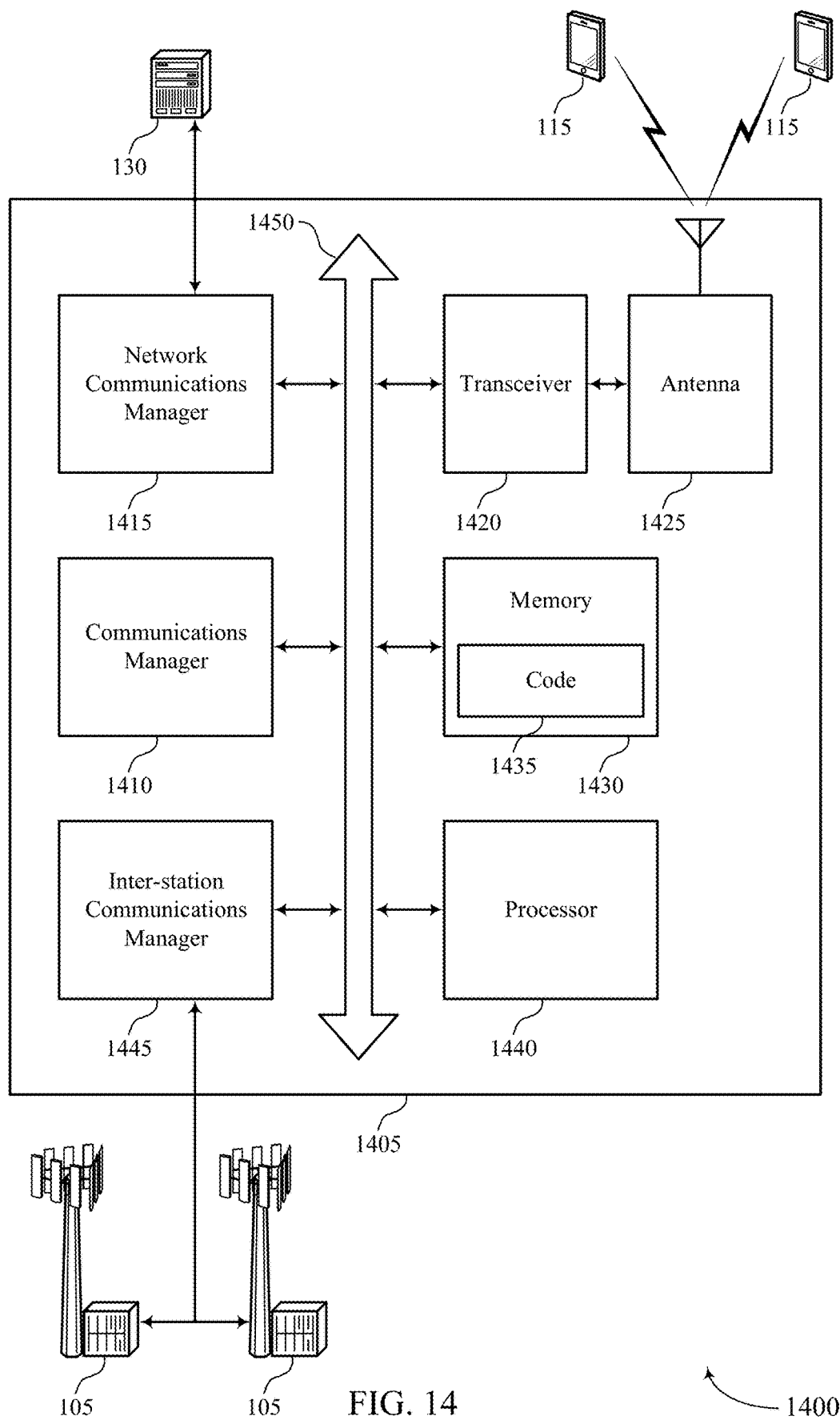
FIG. 14 shows a diagram of a system including a device that supports random access preamble spatial overloading in accordance with aspects of the present disclosure.

FIG. 14 shows a diagram of a system 1400 including a device 1405 that supports random access preamble spatial overloading in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a configuration of random access resources indicating a quantity of a set of random access preambles, a quantity of a set of synchronization signal blocks per random access occasion, and a quantity of random access preambles per synchronization signal block, the transmitted configuration indicating that each random access preamble of the set of random access preambles is available to the UE in the random access occasion for each synchronization signal block of a set of synchronization signal blocks transmitted by the base station and receive, from the UE in the random access occasion, a random access preamble of the set of random access preambles.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting random access preamble spatial overloading).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
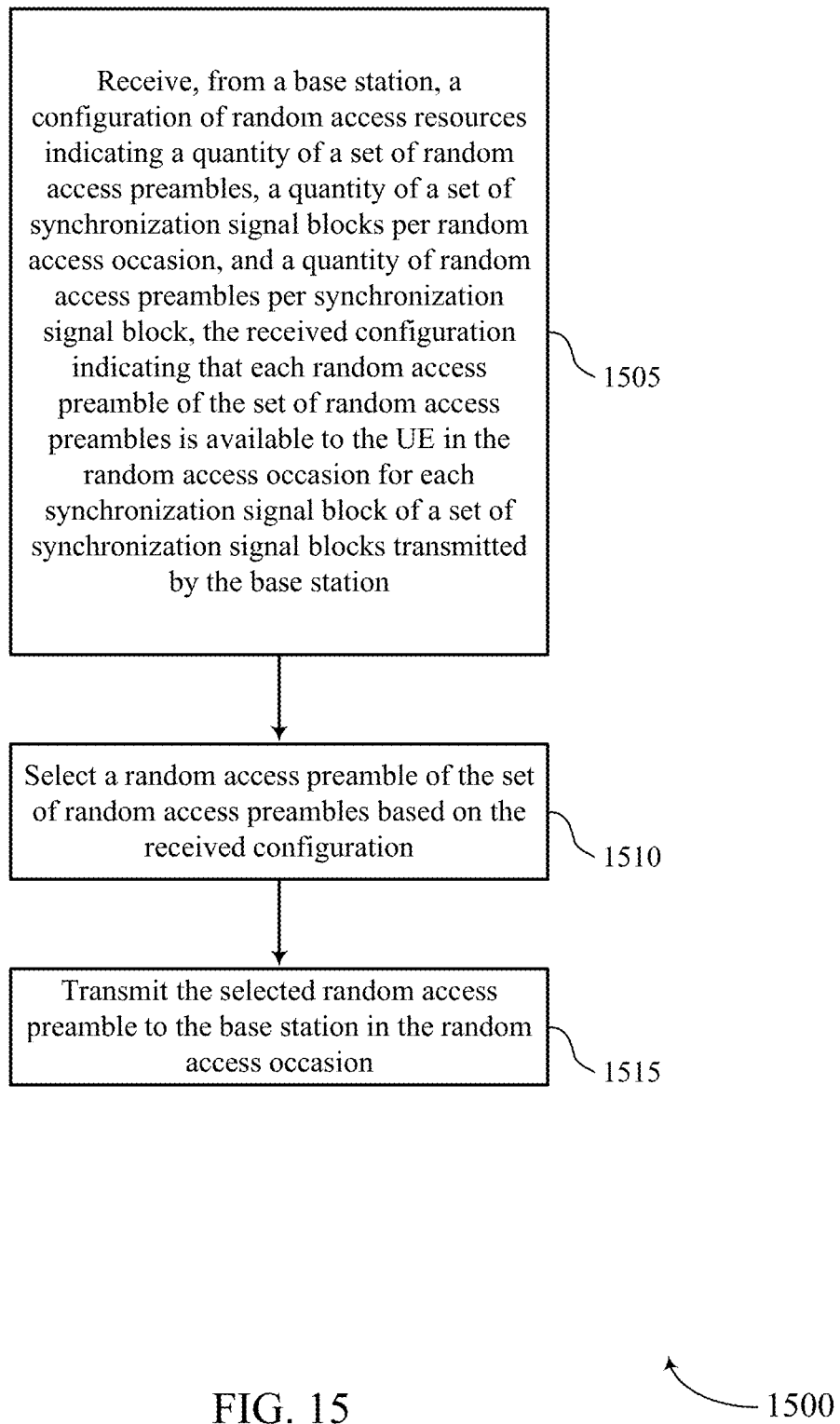
FIGS. 15 through 17 show flowcharts illustrating methods that support random access preamble spatial overloading in accordance with aspects of the present disclosure.

FIG. 15 shows a flowchart illustrating a method 1500 that supports random access preamble spatial overloading in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station. The operations of 1505 may be performed according to the methods described herein. In some examples, aspects of the operations of 1505 may be performed by a configuration manager as described with reference to FIGS. 7 through 10.

At 1510, the UE may select a random access preamble of the set of random access preambles based on the received configuration. The operations of 1510 may be performed according to the methods described herein. In some examples, aspects of the operations of 1510 may be performed by a preamble manager as described with reference to FIGS. 7 through 10.

At 1515, the UE may transmit the selected random access preamble to the base station in the random access occasion. The operations of 1515 may be performed according to the methods described herein. In some examples, aspects of the operations of 1515 may be performed by a random access manager as described with reference to FIGS. 7 through 10.

Figure 16:
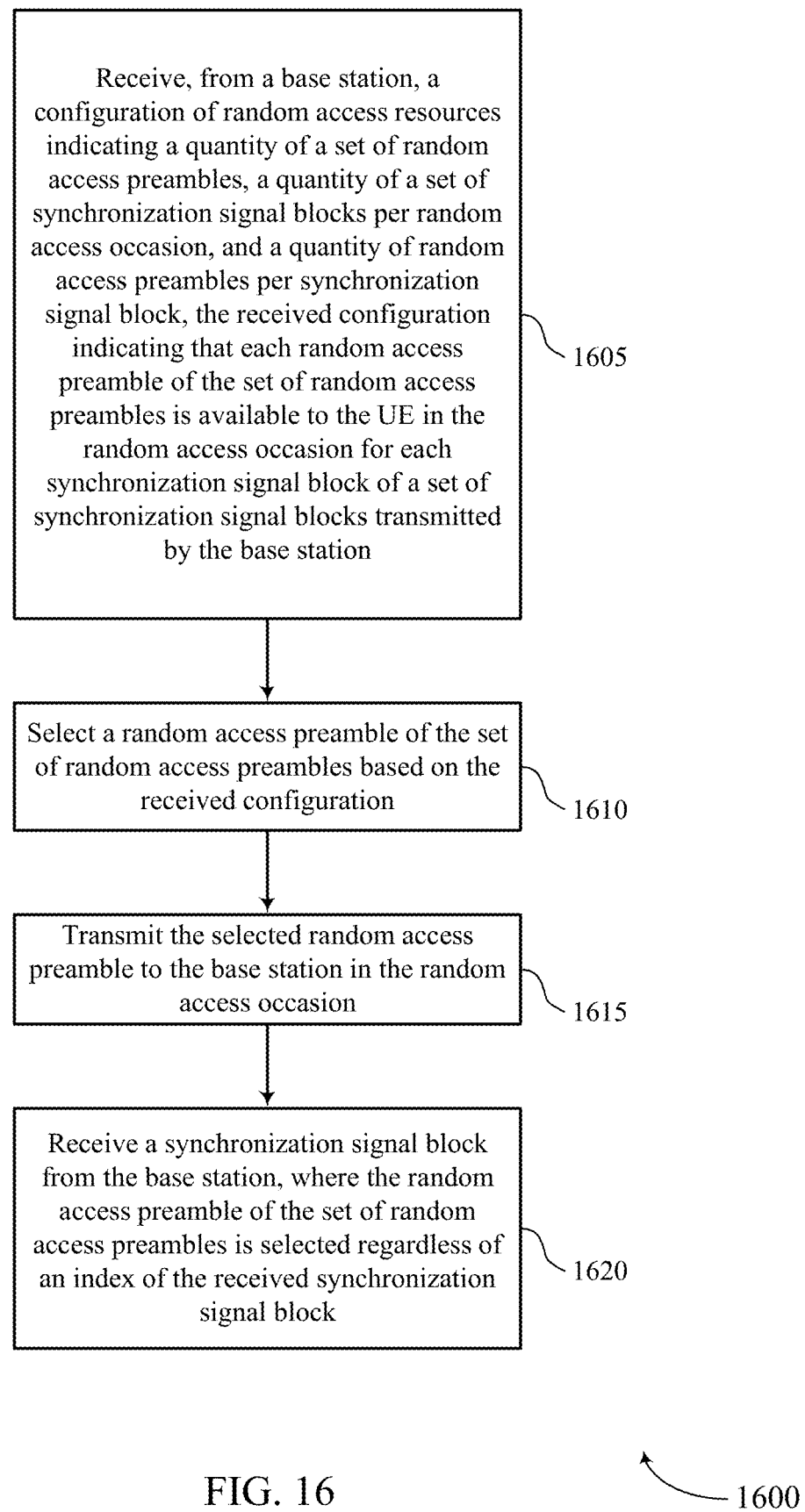

FIG. 16 shows a flowchart illustrating a method 1600 that supports random access preamble spatial overloading in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configuration of random access resources indicating a quantity of a set of random access preambles, a quantity of a set of synchronization signal blocks per random access occasion, and a quantity of random access preambles per synchronization signal block, the received configuration indicating that each random access preamble of the set of random access preambles is available to the UE in the random access occasion for each synchronization signal block of a set of synchronization signal blocks transmitted by the base station. The operations of 1605 may be performed according to the methods described herein. In some examples, aspects of the operations of 1605 may be performed by a configuration manager as described with reference to FIGS. 7 through 10.

At 1610, the UE may select a random access preamble of the set of random access preambles based on the received configuration. The operations of 1610 may be performed according to the methods described herein. In some examples, aspects of the operations of 1610 may be performed by a preamble manager as described with reference to FIGS. 7 through 10.

At 1615, the UE may transmit the selected random access preamble to the base station in the random access occasion. The operations of 1615 may be performed according to the methods described herein. In some examples, aspects of the operations of 1615 may be performed by a random access manager as described with reference to FIGS. 7 through 10.

At 1620, the UE may receive a synchronization signal block from the base station, where the random access preamble of the set of random access preambles is selected regardless of an index of the received synchronization signal block. The operations of 1620 may be performed according to the methods described herein. In some examples, aspects of the operations of 1620 may be performed by a preamble manager as described with reference to FIGS. 7 through 10.

Figure 17:
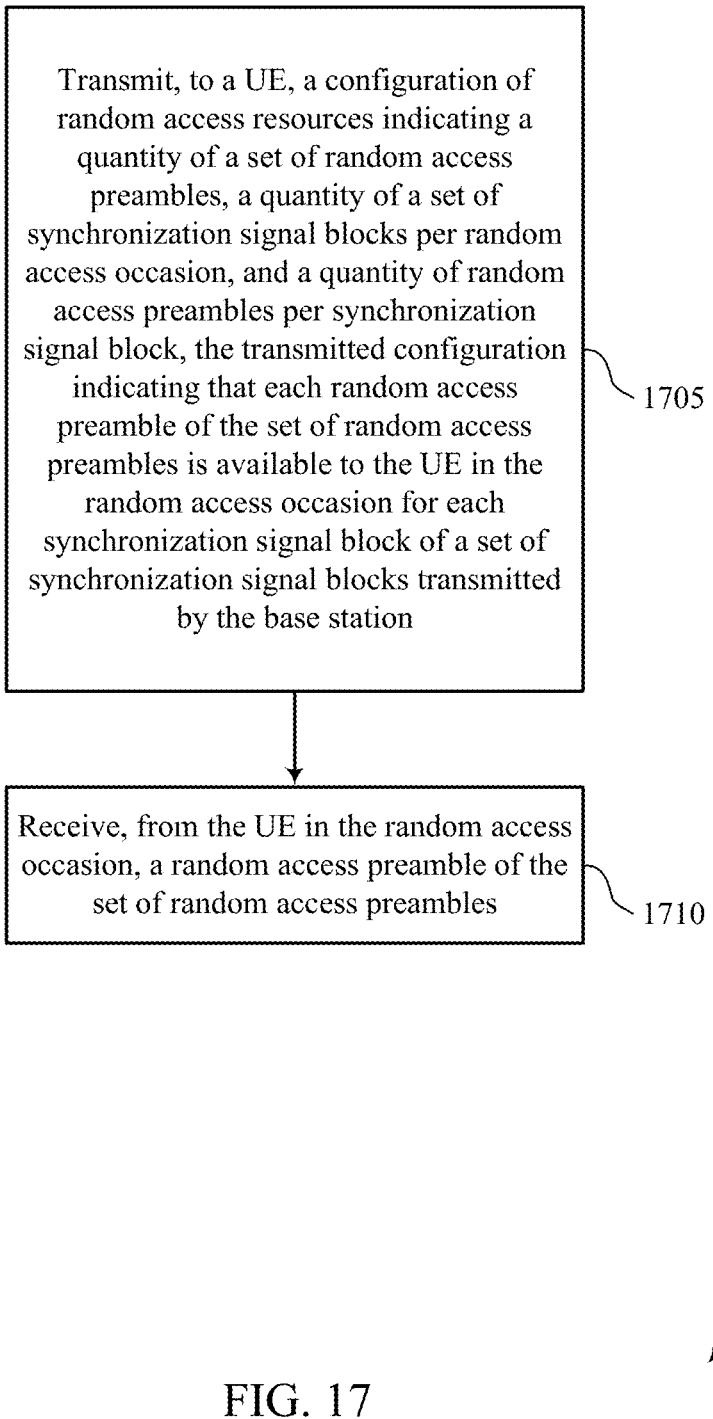

FIG. 17 shows a flowchart illustrating a method 1700 that supports random access preamble spatial overloading in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a configuration of random access resources indicating a quantity of a set of random access preambles, a quantity of a set of synchronization signal blocks per random access occasion, and a quantity of random access preambles per synchronization signal block, the transmitted configuration indicating that each random access preamble of the set of random access preambles is available to the UE in the random access occasion for each synchronization signal block of a set of synchronization signal blocks transmitted by the base station. The operations of 1705 may be performed according to the methods described herein. In some examples, aspects of the operations of 1705 may be performed by a configuration component as described with reference to FIGS. 11 through 14.

At 1710, the base station may receive, from the UE in the random access occasion, a random access preamble of the set of random access preambles. The operations of 1710 may be performed according to the methods described herein. In some examples, aspects of the operations of 1710 may be performed by a preamble component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a configuration of random access resources indicating a quantity of a plurality of random access preambles, a quantity of a plurality of synchronization signal blocks per random access occasion, and a quantity of random access preambles per synchronization signal block, wherein:
   the received configuration indicates that each random access preamble of the plurality of random access preambles is available for selection for each synchronization signal block of a plurality of synchronization signal blocks transmitted by the base station, each synchronization signal block of the plurality of synchronization signal blocks transmitted by the base station being associated with a respective beam for reception of the synchronization signal block, the respective beam being associated with a direction for random access preamble communications;
   receiving, from the base station, a synchronization signal block of the plurality of synchronization signal blocks;
   selecting a random access preamble of the plurality of random access preambles based at least in part on the received configuration, wherein the selected random access preamble is associated with the received synchronization signal block and with each other synchronization signal block of the plurality of synchronization signal blocks transmitted by the base station; and
   transmitting the selected random access preamble to the base station in the random access occasion via a single uplink beam associated with a plurality of narrow receive beams indicative of a direction of the UE relative to the base station.

2. The method of claim 1, wherein the received configuration is a random access configuration common to a cell of the base station.

3. The method of claim 2, wherein receiving the configuration comprises:
   receiving the configuration via radio resource control signaling from the base station.

4. The method of claim 1, wherein the random access occasion is one random access occasion and the quantity of the plurality of synchronization signal blocks associated with the one random access occasion is thirty two.

5. The method of claim 1, wherein the random access occasion is one random access occasion and the quantity of the plurality of synchronization signal blocks associated with the one random access occasion is sixty four.

6. The method of claim 1, wherein a product of the quantity of the plurality of synchronization signal blocks per random access occasion and the quantity of random access preambles per synchronization signal block is greater than sixty four.

7. The method of claim 1, further comprising:
   receiving, from the base station based at least in part on a received synchronization signal block, a random access response message in response to transmitting the selected random access preamble.

8. A method for wireless communication at a base station, comprising:
transmitting, to a user equipment (UE), a configuration of random access resources indicating a quantity of a plurality of random access preambles, a quantity of a plurality of synchronization signal blocks per random access occasion, and a quantity of random access preambles per synchronization signal block, wherein:
the transmitted configuration indicates that each random access preamble of the plurality of random access preambles is available for selection for each synchronization signal block of a plurality of synchronization signal blocks, each synchronization signal block of the plurality of synchronization signal blocks being associated with a respective beam for reception of the synchronization signal block, the respective beam being associated with a direction for random access preamble communications;
transmitting the plurality of synchronization signal blocks;
receiving, from the UE in the random access occasion via one or more of a plurality of narrow receive beams associated with a single uplink beam and indicative of a direction of the UE relative to the base station, a random access preamble of the plurality of random access preambles that is associated with a synchronization signal block, of the plurality of synchronization signal blocks, received by the UE and with each other synchronization signal block of the plurality of synchronization signal blocks transmitted by the base station; and
transmitting, based at least in part on a determination of the direction of the UE relative to the base station, a first random access response message to the UE.

9. The method of claim 8, further comprising:
monitoring concurrently, during the random access occasion, for the plurality of random access preambles using a plurality of receive beams corresponding to the plurality of synchronization signal blocks, wherein one or more receive beams correspond to one synchronization signal block of the plurality of synchronization signal blocks.

10. The method of claim 8, further comprising:
receiving, from a second UE in the random access occasion and on a second receive beam corresponding to a second synchronization signal block of the plurality of synchronization signal blocks, the random access preamble that was also received from the UE in the random access occasion, wherein the second synchronization signal block is the same as a first synchronization signal block corresponding to a first receive beam, or the second synchronization signal block is different from the first synchronization signal block.

11. The method of claim 10, further comprising:
transmitting, based at least in part on receiving the random access preamble on the first receive beam, the first random access response message to the UE on a first transmit beam corresponding to the first synchronization signal block; and
transmitting, based at least in part on receiving the random access preamble on the second receive beam, a second random access response message to the second UE on a second transmit beam corresponding to the second synchronization signal block, wherein the second synchronization signal block is the same as the first synchronization signal block, or the second synchronization signal block is different from the first synchronization signal block.

12. The method of claim 11, further comprising:
determining a potential beam collision based at least in part on the first random access response message and the second random access response message; and
transmitting, based at least in part on determining the potential beam collision, a message to the second UE that is configured to prevent the second UE from decoding the first random access response message, wherein the message is transmitted to the second UE concurrent with the transmission of the first random access response message to the UE.

13. The method of claim 10, further comprising:
identifying the UE and the second UE based at least in part on a spatial separation of the first receive beam and the second receive beam.

14. The method of claim 8, wherein a product of the quantity of the plurality of synchronization signal blocks per random access occasion and the quantity of random access preambles per synchronization signal block is greater than sixty four.

15. The method of claim 8, wherein the transmitted configuration is a random access configuration common to a cell of the base station.

16. The method of claim 15, wherein transmitting the configuration comprises:
transmitting the configuration via radio resource control signaling.

17. The method of claim 8, wherein the random access occasion is one random access occasion and the quantity of the plurality of synchronization signal blocks associated with the one random access occasion is thirty two.

18. The method of claim 8, wherein the random access occasion is one random access occasion and the quantity of the plurality of synchronization signal blocks associated with the one random access occasion is sixty four.

19. An apparatus for wireless communication at a user equipment (UE), comprising:
a processor;
memory coupled with the processor; and
instructions stored in the memory and executable by the processor to cause the apparatus to:
receive, from a base station, a configuration of random access resources indicating a quantity of a plurality of random access preambles, a quantity of a plurality of synchronization signal blocks per random access occasion, and a quantity of random access preambles per synchronization signal block, wherein:
the received configuration indicates that each random access preamble of the plurality of random access preambles is available for selection for each synchronization signal block of a plurality of synchronization signal blocks transmitted by the base station, each synchronization signal block of the plurality of synchronization signal blocks transmitted by the base station being associated with a respective beam for reception of the synchronization signal block, the respective beam being associated with a direction for random access preamble communications;
receive, from the base station, a synchronization signal block of the plurality of synchronization signal blocks;
select a random access preamble of the plurality of random access preambles based at least in part on the received configuration, wherein the selected random access preamble is associated with the received synchronization signal block, and with each other synchronization signal block of the plurality of synchronization signal blocks transmitted by the base station; and transmit the selected random access preamble to the base station in the random access occasion via a single uplink beam associated with a plurality of narrow receive beams indicative of a direction of the UE relative to the base station.

20. The apparatus of claim 19, wherein the received configuration is a random access configuration common to a cell of the base station.

21. The apparatus of claim 20, wherein the instructions to receive the configuration are executable by the processor to cause the apparatus to:

receive the configuration via radio resource control signaling from the base station.

22. The apparatus of claim 19, wherein the instructions are further executable by the processor to cause the apparatus to:

receive, from the base station based at least in part on a received synchronization signal block, a random access response message in response to transmitting the selected random access preamble.

23. An apparatus for wireless communication at a base station, comprising:

a processor;

memory coupled with the processor; and instructions stored in the memory and executable by the processor to cause the apparatus to:

transmit, to a user equipment (UE), a configuration of random access resources indicating a quantity of a plurality of random access preambles, a quantity of a plurality of synchronization signal blocks per random access occasion, and a quantity of random access preambles per synchronization signal block, wherein:

the transmitted configuration indicates that each random access preamble of the plurality of random access preambles is available for selection for each synchronization signal block of a plurality of synchronization signal blocks, each synchronization signal block of the plurality of synchronization signal blocks being associated with a respective beam for reception of the synchronization signal block, the respective beam being associated with a direction for random access preamble communications;

transmit the plurality of synchronization signal blocks;

receive, from the UE in the random access occasion via one or more of a plurality of narrow receive beams associated with a single uplink beam and indicative of a direction of the UE relative to the base station, a random access preamble of the plurality of random access preambles that is associated with a synchronization signal block, of the plurality of synchronization signal blocks, received by the UE and with each other synchronization signal block of the plurality of synchronization signal blocks transmitted by the base station; and transmit, based at least in part on a determination of the direction of the UE relative to the base station, a first random access response message to the UE.

24. The apparatus of claim 23, wherein the instructions are further executable by the processor to cause the apparatus to:

monitor concurrently, during the random access occasion, for the plurality of random access preambles using a plurality of receive beams corresponding to the plurality of synchronization signal blocks, wherein one or more receive beams correspond to one synchronization signal block of the plurality of synchronization signal blocks.

25. The apparatus of claim 23, wherein the instructions are further executable by the processor to cause the apparatus to:

receive, from a second UE in the random access occasion and on a second receive beam corresponding to a second synchronization signal block of the plurality of synchronization signal blocks, the random access preamble that was also received from the UE in the random access occasion, wherein the second synchronization signal block is the same as a first synchronization signal block corresponding to a first receive beam, or the second synchronization signal block is different from the first synchronization signal block.

26. The apparatus of claim 25, wherein the instructions are further executable by the processor to cause the apparatus to:

transmit, based at least in part on receiving the random access preamble on the first receive beam, the first random access response message to the UE on a first transmit beam corresponding to the first synchronization signal block; and transmit, based at least in part on receiving the random access preamble on the second receive beam, a second random access response message to the second UE on a second transmit beam corresponding to the second synchronization signal block, wherein the second synchronization signal block is the same as the first synchronization signal block, or the second synchronization signal block is different from the first synchronization signal block.

27. The apparatus of claim 26, wherein the instructions are further executable by the processor to cause the apparatus to:

determine a potential beam collision based at least in part on the first random access response message and the second random access response message; and transmit, based at least in part on determining the potential beam collision, a message to the second UE that is configured to prevent the second UE from decoding the first random access response message, wherein the message is transmitted to the second UE concurrent with the transmission of the first random access response message to the UE.

28. The apparatus of claim 25, wherein the instructions are further executable by the processor to cause the apparatus to:

identify the UE and the second UE based at least in part on a spatial separation of the first receive beam and the second receive beam.

* * * * *